US012774056B2

(12) United States Patent
Mangum

(10) Patent No.: US 12,774,056 B2
(45) Date of Patent: Oct. 27, 2026

(54) SNOW VEHICLE

(71) Applicant: Allen Mangum, Idaho Falls, ID (US)

(72) Inventor: Allen Mangum, Idaho Falls, ID (US)

(*) Notice: Subject to any disclaimer, the term of this patent is extended or adjusted under 35 U.S.C. 154(b) by 383 days.

(21) Appl. No.: 18/461,441

(22) Filed: Sep. 5, 2023

(65) Prior Publication Data

US 2024/0076010 A1 Mar. 7, 2024

Related U.S. Application Data

(60) Provisional application No. 63/403,818, filed on Sep. 5, 2022, provisional application No. 63/403,819, filed on Sep. 5, 2022, provisional application No. 63/403,820, filed on Sep. 5, 2022.

(51) Int. Cl.
*B62M 27/02* (2006.01)

(52) U.S. Cl.
CPC ....... *B62M 27/02* (2013.01); *B62M 2027/021* (2013.01); *B62M 2027/025* (2013.01); *B62M 2027/026* (2013.01)

(58) Field of Classification Search
CPC ............ B62M 27/02; B62M 2027/021; B62M 2027/025; B62M 2027/026
See application file for complete search history.

(56) References Cited

U.S. PATENT DOCUMENTS

| | | | |
|---|---|---|---|
| 7,017,695 | B2 | 3/2006 | Meunier et al. |
| 7,090,229 | B2 | 8/2006 | Monsrud et al. |
| 7,252,301 | B2 | 8/2007 | Valikangas |
| 7,487,975 | B2 | 2/2009 | Pryputniewicz |
| 8,381,857 | B1 | 2/2013 | Sampson et al. |
| 8,641,055 | B2 | 2/2014 | Simmons et al. |
| 9,731,746 | B2 | 8/2017 | Hodgson et al. |
| 9,988,067 | B1 | 6/2018 | Mangum et al. |
| 10,538,262 | B2 | 1/2020 | Mangum et al. |
| 2002/0041080 | A1 | 4/2002 | Moriyama et al. |
| 2006/0061051 | A1 | 3/2006 | Lemieux |
| 2007/0216114 | A1 | 9/2007 | Simmons et al. |
| 2009/0322045 | A1 | 12/2009 | Lemieux |
| 2012/0222908 | A1 | 9/2012 | Mangum |

(Continued)

FOREIGN PATENT DOCUMENTS

| | | | | |
|---|---|---|---|---|
| CA | 3091610 A1 * | 2/2021 | ............ | B62M 27/02 |
| CA | 3100486 A1 * | 5/2022 | ............. | B62K 13/04 |

(Continued)

*Primary Examiner* — Drew J Brown
(74) *Attorney, Agent, or Firm* — Kunzler Needham Hilton

(57) ABSTRACT

An apparatus to convert a motorcycle into a snow bike includes a front ski assembly with a universal fork clamp assembly and a universal axle clamp assembly. The universal fork clamp assembly is configured to: fasten to fork tubes of the motorcycle from a back side of the front ski assembly; is selectively positionable relative to a spindle body; and is configurable to accommodate a range of fork tube diameters and fork tube spacings. The universal axle clamp assembly is mechanically moveable relative to the spindle body, selectively tightenable to accommodate a range of axle diameters, and selectively positionable to accommodate axles that vary by distance from the fork tubes. The universal axle and fork clamp assemblies couple to an upper portion of the spindle body, and a lower portion of the spindle body couples to a spindle of at least one ski.

17 Claims, 13 Drawing Sheets

(56) References Cited

U.S. PATENT DOCUMENTS

| | | | | |
|---|---|---|---|---|
| 2016/0031471 | A1* | 2/2016 | Anderson | B62B 17/04 280/27 |
| 2017/0129569 | A1* | 5/2017 | Mangum | B62K 13/08 |
| 2017/0247045 | A1* | 8/2017 | Gentry | B62B 19/04 |
| 2020/0140000 | A1 | 5/2020 | Mangum et al. | |
| 2021/0229731 | A1* | 7/2021 | Stoxen | B62B 17/02 |
| 2024/0076011 | A1* | 3/2024 | Mangum | B62M 27/02 |

FOREIGN PATENT DOCUMENTS

| | | | | | |
|---|---|---|---|---|---|
| CA | 3211028 | A1 | * | 3/2024 | B62M 27/02 |
| EP | 1336557 | A2 | * | 8/2003 | B62M 27/02 |
| WO | WO-2017031592 | A1 | * | 3/2017 | B62D 55/04 |
| WO | WO-2017079503 | A1 | * | 5/2017 | B62K 13/00 |
| WO | WO-2019147162 | A1 | * | 8/2019 | B62D 55/10 |

* cited by examiner

SNOW VEHICLE

CROSS-REFERENCE TO RELATED APPLICATION

This application claims the benefit of U.S. Provisional Patent Application No. 63/403,818 entitled SNOW VEHICLE and filed on Sep. 5, 2022 for Allen Mangum which is incorporated herein by reference, U.S. Provisional Patent Application No. 63/403,819 entitled SNOW VEHICLE and filed on Sep. 5, 2022 for Allen Mangum which is incorporated herein by reference, and U.S. Provisional Patent Application No. 63/403,820 entitled SNOW VEHICLE and filed on Sep. 5, 2022 for Allen Mangum which is incorporated herein by reference.

FIELD

This disclosure relates to snow vehicles and more particularly relates to a kit to convert a motorcycle into a snow vehicle.

BACKGROUND

Motorcycles and motorized snow vehicles such as snowmobiles typically include basic components such a body with a seat to accommodate a rider, an engine for propelling the vehicle, handlebars that connect to a front portion of for the vehicle for steering the snow vehicle. However, motorized snow vehicles are typically operated in different conditions than those in which motorcycles are operated. The way an operator rides a motorized snow vehicle with two skis may be different from how an operator rides a motorcycle or from how an operator rides a motorized snow vehicle with one ski. Sometime motorized snow vehicles with one ski are referred to as snow bikes.

SUMMARY

An apparatus to convert a motorcycle into a snow bike is disclosed. In one or more embodiments, the apparatus includes a front ski assembly for converting a motorcycle to a snow vehicle. The front ski assembly, in certain embodiments includes a spindle body with an upper portion that is configured to couple to fork tubes of the motorcycle and a lower portion that is configured to couple to a ski. In one or more embodiments, the front ski assembly includes a fork clamp assembly with fork clamps at both ends of a fork clamp support bar that is coupled to an upper rear portion of the spindle body such that the fork clamp assembly is configured to securely be fastened to the fork tubes from behind the fork tubes.

In various embodiments, the front ski assembly includes an axle clamp assembly where the axle clamp assembly is configured to couple to an upper-forward portion of the spindle body. In certain embodiments, the axle clamp assembly is configured be fastened to a motorcycle axle from a topside of the motorcycle axle. The axle clamp assembly, in one or more embodiments, is configured to be mechanically moveable forwards and backwards relative to the spindle body. In certain embodiments, the axle clamp assembly is configured to be selectively positionable to accommodate motorcycle axles that vary by a predetermined distance from the fork tubes. The axle clamp assembly in various embodiments is configured to be selectively tightenable to accommodate a range of predetermined motorcycle axle diameters.

In one or more embodiments, the fork clamp assembly is universal and is selectively positionable up and down relative to the spindle body via parallel slots in the spindle body, the parallel slots being configured to accommodate a range of predetermined fork tube spacings.

In some embodiments, the fork clamp assembly includes two fork clamps and a fork clamp support bar. In one or more embodiments, the two fork clamps are configured to couple a to the fork clamp support bar, and each fork clamp is independently positionable side to side along a portion of a length of the support bar via parallel slots in the fork clamp support bar. The parallel slots, in certain embodiments, are configured to accommodate a range of predetermined fork tube spacings.

In one or more embodiments, the two fork clamps of the fork clamp assembly are configured to accommodate a range of predetermined fork tube diameters. The fork clamps, in some embodiments, include a fork clamp front half, an interior of the front half having relieved portions and unrelieved portions that configure to fit motorcycle fork tubes ranging between 47 mm and 49 mm in diameter (e.g., 47 mm, 48 mm, 49 mm). The fork clamps in various embodiments includes a fork clamp back half, an interior of the back half comprising a flexible plastic or rubber portion that interfaces with a motorcycle fork tube and is load bearing.

In some embodiments, the unrelieved portions of the front fork clamp half interface with the motorcycle fork tube and the relieved portions of the front fork clamp half do not interface with the motorcycle fork tube.

The front ski assembly, in one or more embodiments includes universal fork tube guards. In some embodiments, the universal fork tube guards are configured to protect the motorcycle fork tubes from damage by covering a front portion of the fork tube. The universal fork tube guards, in certain embodiments are configured to fasten to the fork clamp front half of the front ski assembly. In various embodiments, the universal fork tube guards are configured to allow snow to exit a space between the fork tube guard and the motorcycle fork tube and via holes in sides of the fork tube guard.

An apparatus to convert a motorcycle into a snow bike is disclosed. In one or more embodiments a front ski assembly for converting a front portion of a motorcycle for use as a snow vehicle includes a spindle body with an upper portion that is configured to couple to fork tubes of the motorcycle and a lower portion that is configured to couple to a ski. In some embodiments, the front ski assembly includes an axle clamp assembly where the axle clamp assembly is configured to be fastened to an axle of the motorcycle from above the axle of the motorcycle.

In certain embodiments, the axle clamp assembly is a universal axle clamp assembly that is configured to be mechanically moveable forwards and backwards relative to the spindle body. The universal axle clamp assembly, in some embodiments, is configured to be selectively positionable to accommodate the motorcycle axles that vary by a predetermined distance from the fork tubes and selectively tightenable to accommodate a range of predetermined axle diameters.

In one or more embodiments, the front ski assembly further includes a fork clamp assembly with fork clamps at both ends of a fork clamp support bar that is coupled to an upper rear portion of the spindle body such that the fork clamp assembly is configured to securely be fastened to the motorcycle fork tubes from behind the motorcycle fork tubes. The fork clamp assembly, in some embodiments is configured to be selectively positionable up and down relative to the spindle body. The fork clamps, in one or more embodiments are configured to accommodate a range of predetermined fork tube diameters.

The universal axle clamp assembly, in one or more embodiments, is configured to couple to a portion of the spindle body and is mechanically moveable forwards and backwards relative to the spindle body via parallel slots in the spindle body. In some embodiments, the universal axle clamp is a v-block clamp.

In certain embodiments a live keel ski for a snow vehicle includes a ski body. The ski body, in some embodiments is semi-parabolic in shape across a width of the ski body. In one or more embodiments, the ski body includes a flat ski body center portion that runs lengthwise down a center of the ski body, and two parabolic ski body side portions that run lengthwise down respective sides of the ski body. In various embodiments, the ski includes a ski runner and center skag, suspended from the bottom of the ski body by rubber bumpers. The rubber bumpers, in certain embodiments, are attached on a top portion of the rubber bumper to an underside of the flat ski body center portion and on a bottom portion of the rubber bumper to the center skag and ski runner.

In some embodiments, the ski body is formed as a unitary component. In one or more embodiments, the ski includes three keels. In certain embodiments, each keel forms a portion of the ski body that protrudes from an underside of the ski body. Two outer keels, in one or more embodiment, run respectively along each outer edge of the ski. In certain embodiments a center keel runs down the center of the ski. In various embodiments three skags, one skag protruding below an underside of each keel, two outer skags being attached respectively to the two outer keels, and the center skag being suspended below the center keel.

In one or more embodiments, the skags are bolted directly to an outer edge of the ski and can be selectively removed from the ski body.

In various embodiments, the skags can be removed and exchanged, and the ski is configured to receive exchangeable skags and ski runners of differing heights that can be selected to enhance handling capabilities of the snow bike for operation in different conditions.

The rubber bumpers, in one or more embodiments, are located in relieved portions of the center keel, the center keel preventing snow and other debris from lodging between the center skag and the underside of the ski body.

In some embodiments, the rubber bumpers are configured to flex up and down and side to side such that the center skag and ski runner are moveable up and down and side to side independent of the ski body. The rubber bumpers, in various embodiments, flex to allow the center skag and ski runner to remain flat against the ground when the ski turns or passes over a rough surface. In one or more embodiments, the rubber bumpers absorb shock as the ski passes over rough surfaces.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
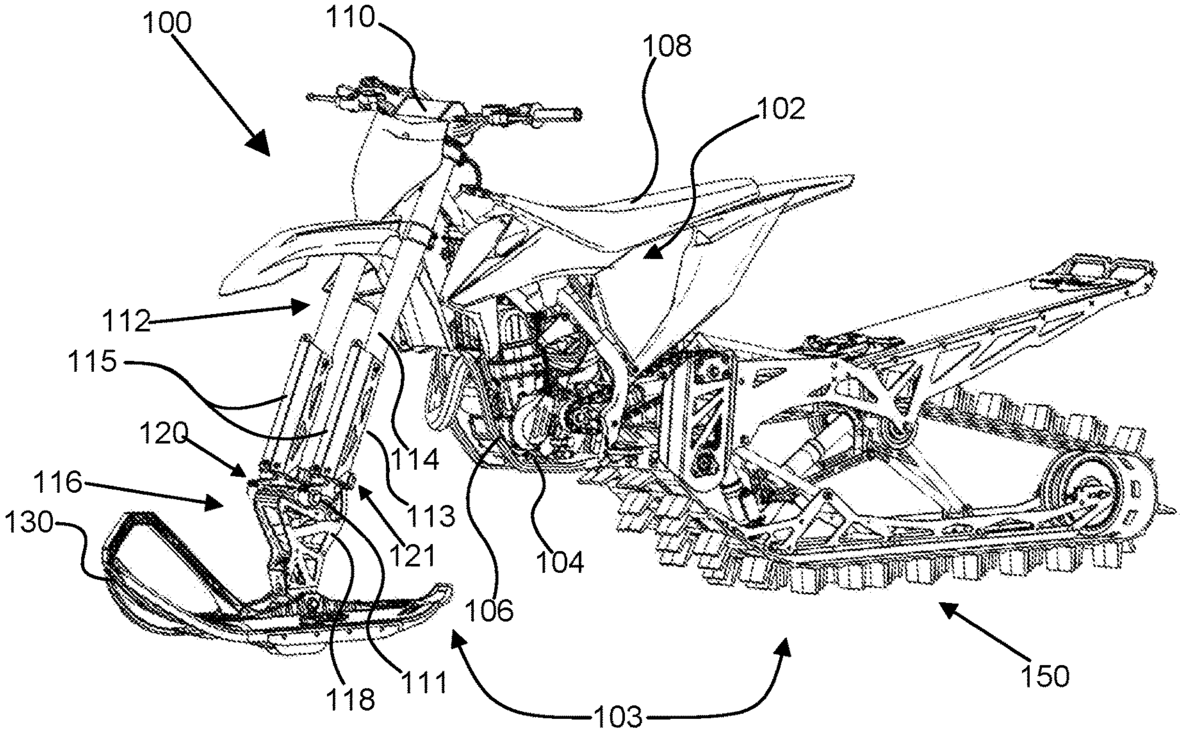
FIG. 1 is a perspective view illustrating one embodiment of a snow bike.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided to give a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

The present disclosure relates to snow vehicles including snow bikes and/or snow mobiles and in particular to a front ski assembly for the same. The front ski assembly serves as a connection mechanism between the steering assembly of the motorcycle and the ski. A selectively configurable front ski assembly is provided to fit a variety of different motorcycles. This patent discloses significant functional improvements over other snow bikes in performance, ease of installation, maintenance, mechanical integrity, reliability, and/or safety, as further described below.

FIG. 1 is a perspective diagram of a snow bike 100, in accordance with one or more examples of the present disclosure. In the example depicted, the snow bike 100 is formed of a motorcycle portion 102 combined with a conversion kit 103. The motorcycle portion 102, as known to those skilled in the art, generally includes a propulsion unit 104 which is shown as a four-stroke engine, a frame 106, a seat 108 for an operator, and a steering assembly 110. The steering assembly 110 includes a front fork 112 having two fork tubes 113 and a first suspension assembly 114, shown as a shock absorber, axially coupled to the front fork tubes 113. The conversion kit 103 includes a front ski assembly 116 and a rear suspension assembly 150. The front ski assembly 116 will be described in greater detail below.

The front ski assembly 116 couples to the fork tubes 113 by a universal fork clamp assembly 121 and a universal axle clamp assembly 120. Universal, as used in this specification, describes a part that can fit various motorcycle models. The universal fork clamp assembly 121 and universal axle clamp assembly 120 are coupled to a spindle body 118. Conventional conversion kits, for motorcycle to snow bike conversion, frequently require adapter kits to account for the wide variety of sizes and spacings of components of a motorcycle. For example, the spacing between motorcycle fork tubes can be in the range of between about 10 and 14 inches. Additionally, the diameter of the fork tubes can vary. Various modern motorcycles have fork tubes between 47 mm and 49 mm in diameter. To accommodate the wide range of fork tube spacings and diameters, conventional kits are either designed specifically for a selected make and model of motorcycle or the conversion kits include spacers that enable the conversion kit to properly fit the motorcycle. Beneficially, the front ski assembly 116 of the present specification is selectively tightenable and spaceable to the fit fork tubes 113 of most motorcycle models.

The front ski assembly 116 accomplishes a universal fit by providing the universal fork clamp assembly 121 and the universal axle clamp assembly 120 that together couple the front ski assembly 116 to the fork tubes 113 of a motorcycle and may allow for modern motorcycles to be converted to snow bikes 100. The front ski assembly 116 may be selectively configured to fit motorcycles with varying fork tube diameters, lengths and spacings. Other snow bike conversion kits currently on the market are not universal and may require additional parts that are specifically designed to fit individual makes and models of motorcycles.

Like motorcycles, snow bikes may be subjected to significant shocks and vibrations in multiple directions over extended periods of time. Additionally, snow bikes may also be subjected to frequent exposure to snow and water over extreme temperature ranges from external temperatures well below freezing to engine temperatures that need to be cooled to operate.

The inventors of the apparatuses and components disclosed herein have come up with various unique combinations of features that enable universal fit while taking into account performance, ease of installation, maintenance, mechanical integrity, reliability, and/or safety.

The universal fork clamp assembly 121 is attached to the fork tubes 113 of the snow bike 100 from the backside of the front ski assembly 116. Parallel slots in a support bar of the universal fork clamp assembly 121 allow for the width of the universal fork clamp assembly 121 to be slidably spaced to fit the different motorcycle fork tubes 113. The universal fork clamp assembly 121 is also selectively moveable up and down relative to the spindle body 118 to accommodate the motorcycle fork tubes 113 of varying sizes.

Fork tube guards 115 are also configured to mount to the front of the universal fork clamp assembly 121. The fork tube guards 115, in one embodiment, curve around the motorcycle fork tubes 113. The fork tube guards 115 may have holes in a side portion of the fork tube guard 115. The fork tube guards 115 protect the fork tubes 113 and the universal fork clamp assembly 121 from damage by covering a front portion of the fork tubes. This may include, for example, damage that can be caused by when an object, such as a tree branch, hits the fork tubes 113 of the snow bike 100 as the snow bike 100 passes by. Most other snow bikes on the market, either do not have fork tube guards or have flawed fork tube guards that obstruct access to the fork clamp. Other fork guards for snow bikes also may sit close to the fork tube which can result in snow and ice becoming trapped in between the fork guard and fork tube. Trapped snow can cause damage to the front suspension and the fork guard.

The fork tube guards 115 do not obstruct access to the universal fork clamp assembly 121 because the universal fork clamp assembly 121 is tightened by bolts located on the backside of the universal fork clamp assembly 121, and the fork tube guards 115 are attached to the frontside of the universal fork clamp assembly 121. Additionally, the holes in the side portions of the fork tube guards 115 and a space between the fork tubes 113 and the fork tube guards 115 prevent snow and ice from becoming trapped between the fork tubes 113 and the fork tube guards 115. Trapped snow and ice can damage the motorcycle fork tubes 113 and the fork tube guards 115. The described design prevents damage to the front ski assembly 116 of the motorcycle and the fork tube guards 115 caused by snow and ice.

The universal axle clamp assembly 120 clamps a front motorcycle axle 111 to the spindle body 118 and holds the front motorcycle axle 111 in place. The universal axle clamp assembly 120 is front-to-back positionable relative to the spindle body 118.

Together, the universal axle clamp assembly 120 and the universal fork clamp assembly 121 allow the front ski assembly 116 to be attached to most modern motorcycles. The front ski assembly 116 links the steering assembly 110 of a motorcycle directly to a live keel ski 130. The live keel ski 130, in certain examples, is semi-parabolic in shape across a width of the ski.

Certain previous snow bike conversion kits have required a series of spacers to enable a front ski assembly to fit any given motorcycle, or they have required users to purchase a front ski assembly that is specifically designed to fit a given motorcycle model. The front ski assembly 116 disclosed herein eliminates the need for spacers and saves users time and money during installation.

Figure 2A:
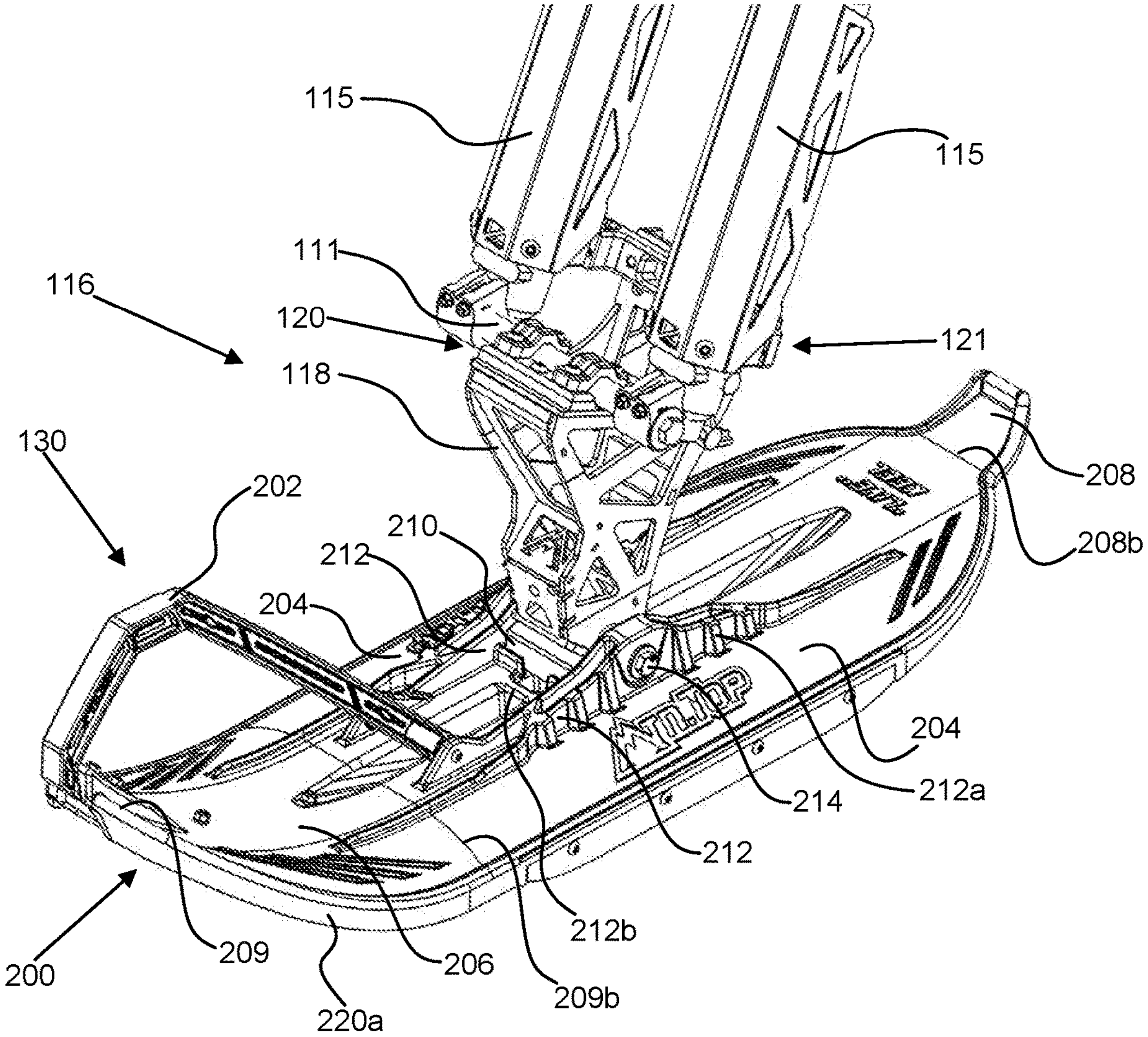
FIG. 2A is a perspective view of a front ski assembly attached to a live keel ski and snow bike of FIG. 1.
Figure 2B:
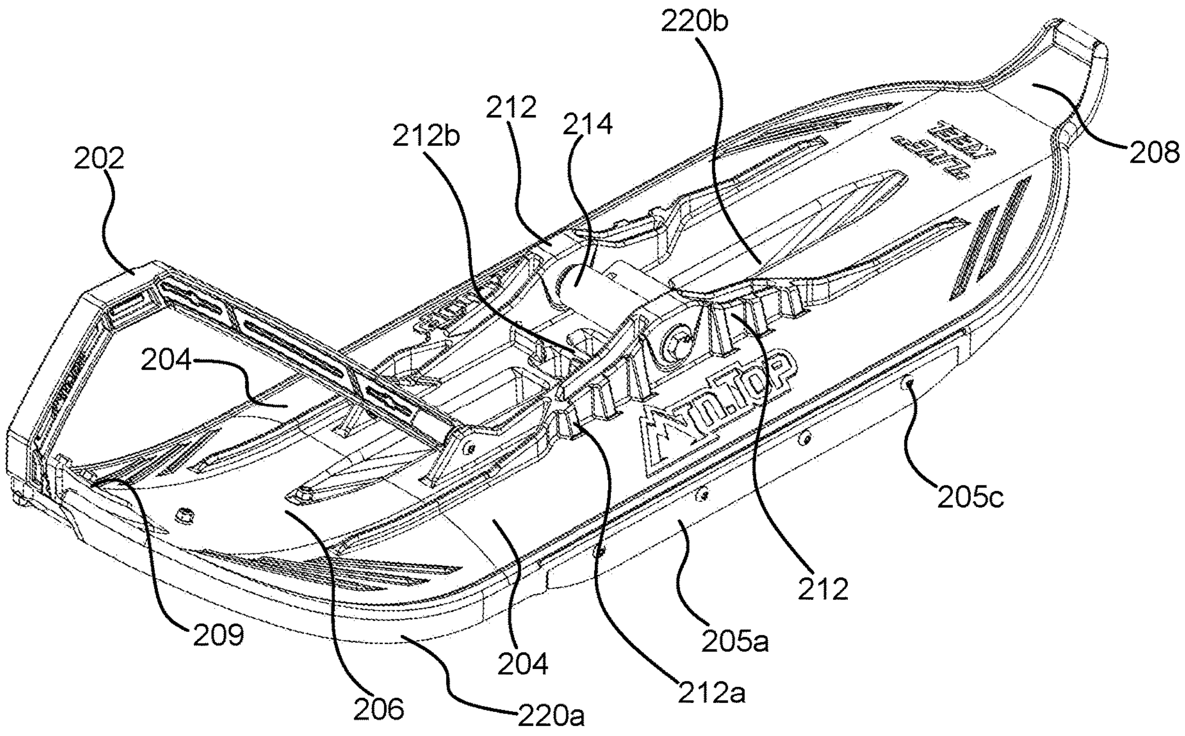
FIG. 2B is a perspective view of the live keel ski of FIG. 2A.
Figure 2C:
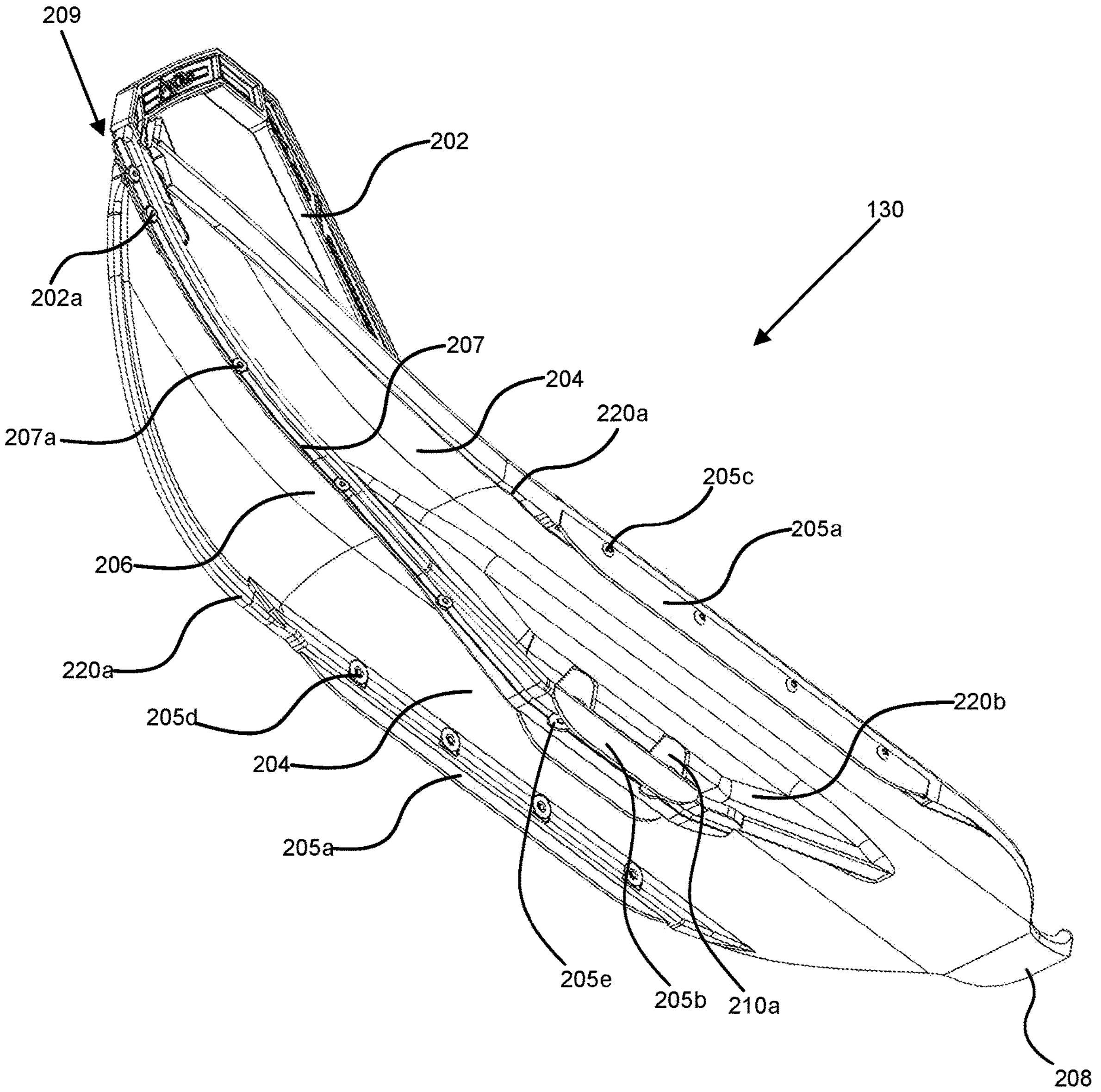
FIG. 2C is a perspective view of the underside of the live keel ski of FIG. 2A.
Figure 2D:
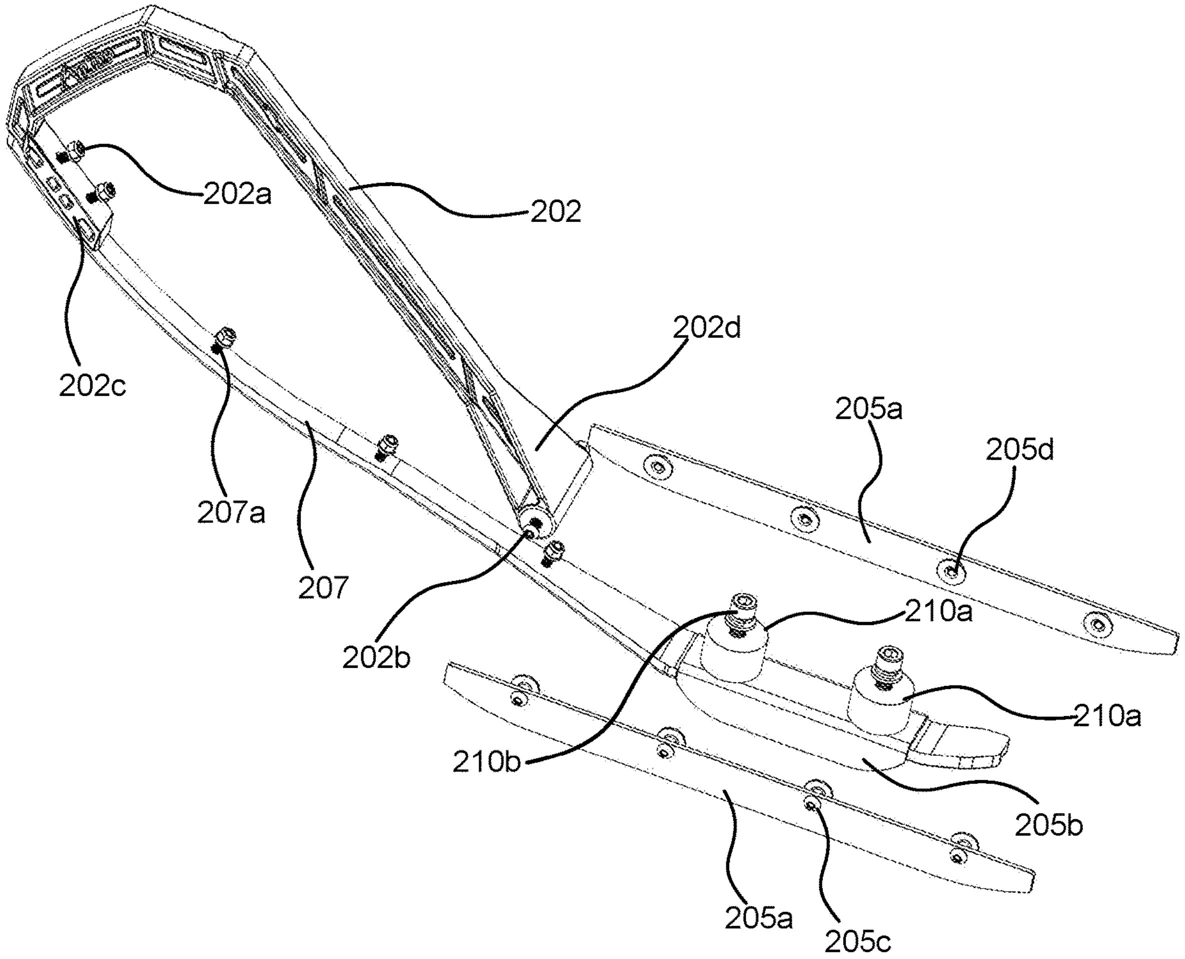
FIG. 2D is a perspective view of select components of the live keel ski of FIG. 2A.
Figure 2E:
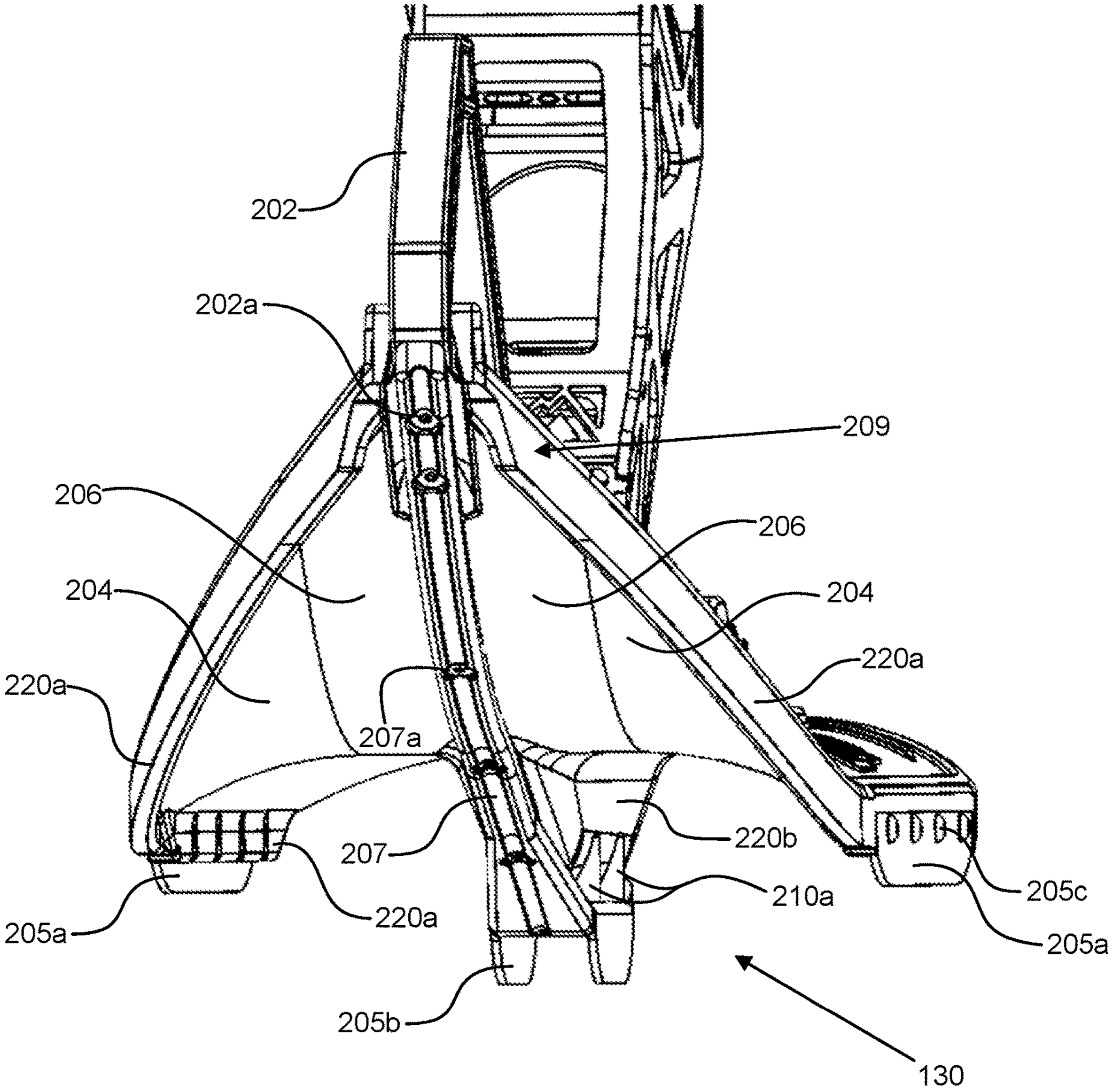
FIG. 2E is a front perspective view of the live keel ski of FIG. 2A.

FIG. 2A is a perspective view of an apparatus comprising the front ski assembly 116 coupled to both the live keel ski 130 and the motorcycle fork tubes 113. FIG. 2B is a perspective view of the live keel ski 130 detached from the front ski assembly 116. FIG. 2C is a perspective view of an underside of the live keel ski 130. FIG. 2D is a perspective view of various live keel ski 130 parts. FIG. 2E is a perspective view of the front of the live keel ski 130.

Referring to FIG. 2A, the live keel ski 130 is seen coupled to a bottom portion of the spindle body 118. A ski body 200 of the live keel ski 130 has a semi-parabolic shape across a width of the ski body 200 which helps funnel snow into the live keel ski 130. The ski body 200 is made as a unitary component. By way of example, the ski body may be made using a mold. The ski body 200 may in one embodiment be made of injection molded plastic. A center third of the ski body 200 is flat and the two outer thirds of the ski body are parabolic. A flat ski body center portion 206 and two parabolic ski body side portions 204 form the semi-parabolic shape of the ski body 200. In this specification, the term “side” refers to a left side or a right side, not a topside, underside, frontside, or backside unless otherwise indicated.

By way of example, in one embodiment the shape of the width of the ski may be described as follows. The flat ski body center portion 206 may be defined as the space between two ski ridges 212. The parabolic ski body side portions 204 may be defined as the space from the ski ridge 212 to an outer edge of the ski body on each respective side of the ski body 200.

A ski front portion 209 (also referred to as a ski front end) is part of the ski body 200 and may be parabolic in shape. The ski front portion 209 may be parabolic across a portion of a length of the ski. The ski front portion 209 may end in a point. The parabolic shape of the ski front portion 209 may bias the live keel ski 130 to travel above the snow and may prevent the ski front portion 209 from digging into the snow. A ski back end 208 is part of the ski body 200 and may be parabolically shaped. The parabolic shape of the ski back end 208 may prevent the ski back end 208 from digging into the snow and may biases the live keel ski 130 to travel above the snow. A ski middle portion is part of the ski body 200 and may be flat in shape. The ski middle portion may span the distance between the ski front portion 209 and the ski back end 208.

By way of example, in one embodiment the shape of the length of the ski may be described as follows. The ski front portion 209 may be defined as a portion of the ski body 200 between a front tip of the ski body 200 and a line 209*b*, that is shown crossing a width of the ski body 200 in FIG. 2A. The ski middle portion may be defined as the portion of the ski body between the line 209*b* and a line 208*b*. The line 208*b* is shown crossing a width of the ski in FIG. 2A. The ski back end 208 may be defined as a portion of the ski body 200 between the line 208*b* and a back of the ski body 200.

Other skis used for snow bikes may be flat or have a semi-circular shape across a width of the ski. Flat ski designs may limit the ability of the ski to grip the snow as the user attempts to steer the snow bike. Flat ski designs may compensate for the poor grip and traction by placing larger keels on the underside of the ski. However, large keels may struggle to turn because they can easily become stuck on objects in the snow or catch on ice. Excessively long keels may decrease the performance of the snow bike. Semi-circular shaped ski designs may have trouble maintaining stability because there is no flat surface for the ski to balance on. Semi-circular shaped skis may increase the likelihood of a user crashing the snow bike. The semi-parabolic shape of the ski body 200 allows for increased grip of the snow without having an extremely aggressive outer keel 220*a*. The semi-parabolic shape of the ski body 200 increases stability by providing the flat ski body center portion 206. The spindle body 118 is linked to the flat ski body center portion 206.

Referring to FIGS. 2A-2B, two ridges 212 run lengthwise, parallel to each other, along a topside of the flat ski body center portion 206. The ridges 212 are part of the ski body 200 and provide strength to the ski body 200. Ridges 212 are an attachment point between the live keel ski 130 and the spindle body 118. The ridges 212 are reinforced by a series of buttresses 212*a*. The buttresses 212*a* provide extra strength to the ridges 212. The buttresses 212*a* are located along an outer portion of the ridge 212 and protrude outward from the outer portion of the ridge 212.

The respective ridges 212 are connected to each other by a series of ridge connection portions 212*b*. The ridge connection portions 212*b* link an inside portion of the respective ridges 212 together and provide strength and support to each ridge. The ridge connection portions 212*b* may span the width of a space between ridges 212 and may reach from a bottom edge to a top edge of the inside portion of the respective ridges 212. The ridge connection portions 212*b* may be approximately rectangular in shape. In one embodiment there may be four ridge connection portions 212*b* between the respective ridges 212. The buttresses 212*a* and the ridge connection portions 212*b* give the ridges 212 sufficient strength to serve as a connection point between the live keel ski 130 and the spindle body 118. The ridges 212 also serve as a connection point for a ski loop 202.

Referring to FIGS. 2B-2D, the ski loop 202 is j-shaped when detached from the ski body 200 and is attached to the ski body 200 at two points. A first end 202*c* of ski loop 202 is attached near the ski front portion 209 to an underside of the flat ski body center portion 206 and a second end 202*d* of ski loop 202 is attached to a front portion of the ski ridges 212. The first end 202*c* corresponds to the end portion at the shorter curved portion of the j-shape (as shown in FIG. 2D). The first end 202*c* of the ski loop 202 curves under the ski front portion 209 is attached to the underside of the ski front portion 209. The first end 202*c* may include holes that are configured to receive bolts. The second end 202*d* of the ski loop 202 corresponds to a straight portion of the j and is attached to the ski ridges 212. In one embodiment, the ski loop 202 may begin to widen and form a triangular portion at the second end 202*d*. The triangular portion of the second end 202*d*, in one embodiment, may include a cylinder with an axial hole through the center. The axial hole may be configured to receive a ski loop axle 202*b*. The triangular portion of the second end of the ski loop 202 strengthens the ski loop 202 such that the ski loop 202 can withstand impacts and other external forces that may occur as the live keel ski 130 travels through the snow.

In one embodiment, the first end 202*c* of ski loop 202 is attached to the underside of the ski front portion 209 using two bolts 202*a* and the second end 202*d* of the ski loop 202 is attached to the ski ridges 212 by the ski loop axle 202*b*. The underside of the ski front portion 209 is configured to receive the first end 202*c* and the bolts 202*a*. The bolts 202*a* are inserted from an underside of the ski front portion 209 and pass through the ski front portion 209 and the first end 202*c* of the ski loop 202. The bolts 202*a* are secured by a washer and nut on the topside of the ski front portion 209.

In another embodiment, the second end 202*d* of ski loop 202 is connected to the ski ridges 212 by a ski loop axle 202*b*. The ski loop axle 202*b* is a bolt that includes a head portion and a shaft portion. A shaft portion of the ski loop axle 202*b* passes through a hole in each ridge 212 and the axial hole at the second end 202*d* of the ski loop 202. The ski loop axle 202*b* is secured to the ski ridges 212 on one side of the ski loop axle 202*b* by the ski loop axle 202*b* head portion and on the other side of the ski loop axle 202*b* by a nut. When tightened the ski loop axle 202*b* holds the second end 202*d* of the ski loop 202 to the ski ridges 212.

The ski loop axle 202*b* allows the ski loop 202 to rotate around the ski loop axle 202*b*. In one embodiment, the ski loop 202 serves as a shock absorber against impacts made to the live keel ski 130 at the ski front portion 209. In another embodiment the ski loop helps the live keel ski 130 cut through the snow and adds strength to the ski body 200.

The spindle body 118 is attached to the ridges 212 by a ski axle 214. The ski axle 214 runs through each of the ridges 212 and through the spindle body 118 to link the live keel ski 130 to the spindle body 118. The ski axle 214 can be coupled to various skis not only the live keel ski 130 disclosed herein. The ski axle 214 enters the spindle body 118 near a bottom portion of the spindle body 118 normal to one side of the spindle body 118 and exits the spindle body 118 normal to the opposite side. In one embodiment, the ski axle 214 is encompassed by a series of bushings that reduce friction and vibration and allow for the live keel ski 130 to rotate around the ski axle 214. In another embodiment, the ski axle 214 is a threaded bolt that passes through a series of bushings and may be secured to the ridges 212 and the ski body 200 using a nut. A bottom of spindle body 118 sits on top of a rubber dampener 210. Beneficially, the rubber dampener 210 rests flush to the flat ski body center portion 206 and limits the degree to which the live keel ski 130 can rotate around the ski axle 214. The rubber dampener 210 makes the snow bike 100 safer because the rubber dampener 210 prevents the live keel ski 130 from over-rotating and diving into the snow, which could lead to a dangerous crash. The rubber dampener 210 also serves as a shock absorber and gives the snow bike 100 a smoother ride.

Referring to FIGS. 2C-2E, among features that improve performance, safety, maintenance of the snow bike, in certain embodiments the live keel ski 130 has three keels located on an underside of the ski body 200. The keels are a feature of the ski body 200. The outer keel 220*a* is located along each respective side of the live keel ski 130 and a center keel 220*b* runs along the underside of the flat ski body center portion 206 of the live keel ski 130 in between the two ridges 212.

In one embodiment, the ski body 200 may have two outer keels 220*a*. A front end of each of the respective outer keels 220*a* may emerge from the ski body 200 at an angle less than 45 degrees near the ski front portion 209. A back end of each of the respective outer keels 220*a* may taper into the ski body 200 on the ski middle portion near the ski back end 208. A middle of each of the respective outer keels 220*a* may run along an edge of the ski body 200 between the front end and the back end of the outer keel 220*a*. The front end and the back end of each of the respective outer keels 220*a* may gradually taper into the ski body 200 at an angle less than 45 degrees. The gradual taper of the outer keels 220*a* out of and into the ski body 200 prevents the outer keels 220*a* from catching or snagging on debris as the live keel ski moves through the snow.

In one embodiment, the center keel 220*b* may be more aggressive than the outer keels 220*a*. The center keel 220*b* may protrude from the underside of the flat body center portion 206 of the ski body 200. The center keel 220*b* may run the length of the ski middle along the underside of the ski body. The center keel 220*b* may gradually emerge and subside from the underside of the ski body 200. In one embodiment, there may be relieved portions in the center keel 220*b*. As a result of the center keel 220*b* protruding from the underside of the ski body 200, there may be a trough in the topside of the flat body center portion 206. The trough is an inner surface, or in other words, a topside of the center keel 220*b*. The trough is depicted in FIGS. 2A and 2B. The ridge connection portions 212*b* of FIGS. 2A and 2B pass across the through and divide the trough into sections.

The keels help the live keel ski 130 grip the snow and steer the snow bike 100. Skags protrude below each of the respective keels to further enhance gripping and steering capabilities. An outer skag 205*a* is attached to each respective outer keel 220*a* of the ski body 200 and a center skag 205*b* is attached to a rubber bumper 210*a*. By way of example, each of the respective outer skags 205*a* may be attached to an outer edge of the outer keel 220*a* using four bolts 205*c* and the center skag 205*b* may be attached to the rubber bumpers 210*a* by bolts 205*e*. The bolts 205*c* may pass through the outer skag 205*a* and the outer keel 220*a* and fasten to a skag nut 205*d* to hold the outer skag 205*a* to the outer keel 220*a*. The outer keel 220*a* is configured with relieved portions on an inside of the outer keel 220*a*. The relieved portions of the outer keel 220*a* are configured to house the skag nut 205*d*. The relieved portions of the outer keel 220*a* may prevent the skag nut 205*d* from being struck with chunks of ice or debris as the live keel ski 130 passes through the snow. A shank of the bolts 205*e* may pass through the center skag 205*b* and a ski runner 207 and be secured in the rubber bumper 210*a*, fastening the center skag 205*b* to the rubber bumper 210*a*. The rubber bumpers 210*a*, in various embodiments, are configured to flex to allow the center skag 205*b* and ski runner 207 to remain flat against the ground when the live keel ski 130 turns or passes over a rough surface.

Bolting the skags to the live keel ski 130 makes the skags exchangeable. The skags of the live keel ski 130 may be replaced or exchanged for several types or sizes of skags without replacing the entire live keel ski 130 and without specialty tools such as welding equipment. This is a desirable feature because the skags may become damaged as the skags contact the ground or debris as the live keel ski 130 travels through the snow. As ski skags become damaged, the snow bike's 100 handling capabilities decrease. A decrease in the handling capabilities of the snow bike 100 increases the chances of a user losing control of the snow bike 100 and crashing. By using the exchangeable ski skags disclosed herein, the overall safety and handling of the snow bike 100 is significantly improved.

Previous snow bike skis have secured skags to skis using welded studs or rivets. Welded studs and rivets may prevent the skags from being easily removeable and exchangeable because they may be difficult to remove and replace. Previous skags have also been attached to the underside of the ski, not the outer keel of the ski or a rubber bumper. If a skag became damaged, previous skis required the user to either replace the entire ski or remove the skag and weld or rivet a new skag to the ski. The outer skags 205*a* and the center skag 205*b* are a significant improvement over the prior art because only simple tools are required to remove the bolts 205*c* and skag nuts 205*d* to replace the outer skags 205*a* and to remove the bolts 205*e* to replace the center skag 205*b*.

Furthermore, outer skags 205*a* and center skags 205*b* of different heights can be interchangeably fixed to the live keel ski 130 to enhance the responsiveness of the steering. The ability to select skag height, and in turn the responsiveness of the steering, is desirable because different skag heights may be optimal, depending on the snow conditions, to achieve optimal traction. Shorter skags may be desirable in icy conditions and when trail riding because the shorter skag does not become lodged in the snow or ice as easily as the taller skags do. The taller skags may be desirable in powder snow conditions as the taller skag will dig deeper into the snow than the shorter skags, producing increased friction and enabling more responsive turning of the snow bike 100. Medium height skags may be desirable in situations when performance in varying snow conditions is desired.

The ski runner 207 runs from the ski front portion 209 of the live keel ski 130 to a back portion of center keel 220*b* along the underside of the flat ski body portion 206 and the center keel 220*b*. The ski runner 207 attaches to the ski front portion 209. In one embodiment, the ski runner 207 may attach to the ski front portion 209 at the same position as the first end 202*c* of the front ski portion 209 using bolts 202*a*.

The ski runner 207 is exchangeable and may be made of plastic, rubber, or a similar material. In one embodiment, a first portion of the ski runner 207 is mounted to a front portion of the center keel 220*b* a second portion of the ski runner 207 is mounted to the center skag 205*b* and rubber bumpers 210*a*, and a third portion of the ski runner 207 extends from the backside of the center skag 205*b*. The ski runner 207 is attached to the ski front portion 209 and center keel 220*b* via bolts 207*a*. The bolts 207*a* include a shaft portion and a head portion. The shaft portion of the bolts 207*a* passes through holes in the ski runner 207 and through holes in the ski body 200. A nut is attached to each bolt 207*a* on a topside of the ski body 200 to secure the ski runner 207 to the ski front portion 209 and the center keel 220*b*. The second portion of the ski runner 207, that is mounted to the center skag 205*b* and the rubber bumpers 210*a*, is suspended from the underside of the live keel ski 130 and does not contact the center keel 220*b*. There may be a space between the center keel 220*b* and the ski runner 207. The second portion of the ski runner 207 is secured to the center skag 205*b* and the rubber bumpers 210*a* via a bolt 205*e*. The ski runner 207 can become damaged as the ski runner 207 contacts the ground or debris as the live keel ski 130 travels through the snow. Bolts 202*a*, 207*a* and 205*e* may be removed using common tools to remove ski runner 207 from the underside of the ski body 200. The ski runner 207 may then be exchanged for a new ski runner 207. The exchangeable ski runner 207 allows the user to easily replace the ski runner 207, if the ski runner 207 is damaged, to return the snow bike 100 to optimal performance. Ski runners 207 of varying materials and varying heights may be attached to the live keel ski 130 to enhance performance. A stiffer ski runner 207 may give the live keel ski more traction whereas a less stiff ski runner 207 may be more desirable in other conditions. Ski runners 207 of varying aggressiveness may be used to enhance performance. Furthermore, the ski runner 207 can be exchanged and replaced with a ski runner 207 that meets the performance characteristics desired by the user.

The rubber bumper 210*a* is a significant improvement over previous snow bike skis that have suspended a ski runner off an underside of the ski or used a rubber bumper on the underside of the ski to create a smoother ride. Previous snow skis that have attempted to suspend a ski runner from the underside of the ski with a flexible mount have been prone to crashes. Previous snow skis with skags suspended off the bottom of the ski have the tendency to produce snow and ice buildup between an underside of the ski and a ski runner or a rubber bumper because the other skis have not sufficiently supported the bumpers or created features to block snow from entering between the ski and the suspended ski runner. In these previous snow bikes, snow and ice easily became trapped in between the ski runner and the ski. The snow buildup hampered the performance of the rubber bumper and caused dangerous loss of control.

In one embodiment of the claimed live keel ski 130, a top portion of the rubber bumper 210*a* is fastened to the underside of the center keel 220*b* of the live keel ski 130 at a relieved portion of the center keel 220*b* via a bolt 210*b*. A bottom portion of the rubber bumpers 210*a* is attached to the ski runner 207 and the center skag 205*b* via bolt 205*e*. A middle portion of the rubber bumper 210*a* does not have a bolt passing through, thus the middle portion of the rubber bumper 210*a* may flex and bend.

The center keel 220*b* is relieved in such a way that the ski runner 207 runs along the underside of the live keel ski 130 parallel to the ski body 200, and the center keel 220*b* at the second portion of the ski runner 207. At the second portion of the ski runner 207, the ski runner 207 is suspended from the underside of the center keel 220*b* as mentioned above.

Figure 4A:
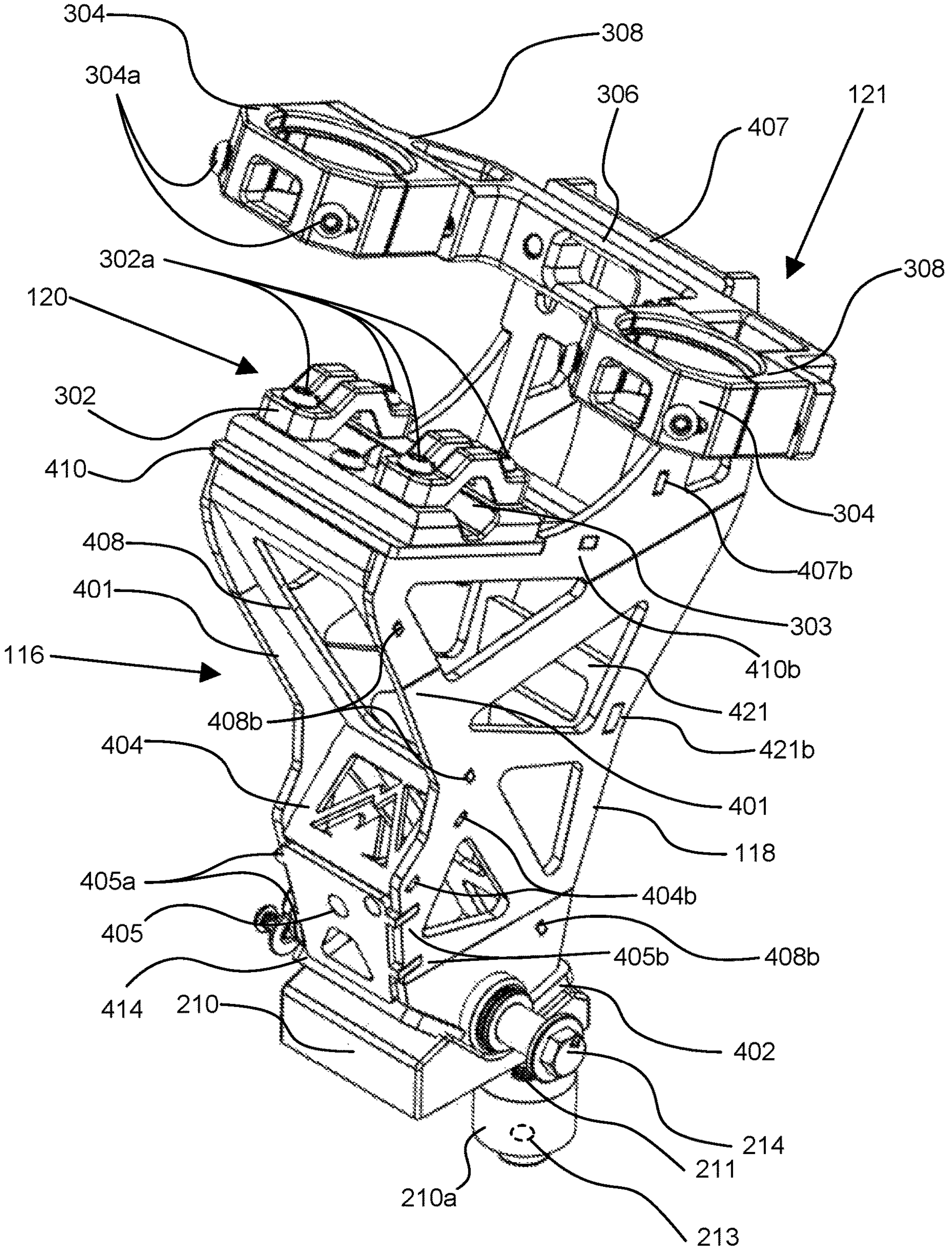
FIG. 4A is a perspective view of selected components of the front ski assembly of FIG. 2A.

In one embodiment, the rubber bumper 210*a* may have a first axial hole 211 on a top portion of the rubber bumper 210*a* and a second axial hole 213 on a bottom portion of the rubber bumper 210*a* as depicted in FIG. 4A. The first axial hole and the second axial hole may each have a threaded metal insert positioned in the hole. The threaded metal insert (not shown) in the first axial hole may be configured to receive bolt 210*b* and the threaded metal insert of the second axial hole may be configured to receive bolt 205*e*.

In one embodiment, there may be two rubber bumpers 210*a*. By way of example, the ski runner 207 and center skag 205*b* may be bolted to each of the two respective rubber bumpers 210*a* by the bolt 205*e*. The bolt 205*e* may be secured into the bottom portion of rubber bumper 210*a* but may not pass through the entire rubber bumper 210*a*. In another embodiment, the top portion of the rubber bumpers 210*a* may be fastened to the relieved portion of the center keel 220*b* using bolts 210*b*; the nut of the bolt 210*b* may be located in the trough that is the inside portion of center keel 220*b*. The bolts 210*b* may be secured into the top portion of rubber bumpers 210*a* but may not pass through the entire rubber bumper 210*a*. The top portion of rubber bumper 210*a* may be fastened to the relieved portion of the center keel 220*b* using the bolts 210*b* and the bottom portion of rubber bumper 210*a* may be fastened to the center skag 205*b* and the ski runner 207 using the bolt 205*e*. Neither the bolt 205*e* nor the bolt 210*b* may pass through the entire rubber bumper 210*a*, such that the middle portion of the rubber bumper 210*a* may have no bolt passing through it. Thus, the middle portion of the rubber bumper 210*a* may flex and bend without being hindered by a bolt.

The center keel 220*b* supports the rubber bumpers 210*a* and blocks snow from entering between the underside of the ski body 200 and the center skag 205*b* to prevent snow build up. By way of example, in the live keel ski 130, the center keel 220*b* may support and protect the rubber bumpers 210*a* on a frontside and a backside of each rubber bumper. The rubber bumpers 210*a* are cylindrical in shape and the relieved portion of the center keel 220*b* has an at least partially cylindrical relief for each rubber bumper 210*a* that is configured to hold the rubber bumper 210*a* and prevent snow from disrupting the function of rubber bumper 210*a*. The front portion of the center keel 220*b* spans the distance between a point where the center keel 220*b* begins to emerge from the underside of the ski body to a first rubber bumper 210*a*. The front portion of the center keel 220*b* may protect a first rubber bumper 210*a* from the ingress of snow. A center portion of the center keel 220*b* may protrude in between the first rubber bumper 210*a* and a second rubber bumper 210*a*, protecting both the first rubber bumper 210*a* and the second rubber bumper 210*a* from the ingress of snow. The rear portion of the center keel 220*b* spans a distance between the second rubber bumper 10*a* and a point where the center keel 220*b* recedes into the underside of the ski body 200. The rear portion of the center keel 220*b* protects the second rubber bumper 210*a* from the ingress of snow.

In certain embodiments, the at least partially cylindrical relief portions of the center keel 220*b* are located between the front portion of the center keel and the center portion of the center keel 220*b* and between the center portion of the center keel 220*b* and the rear portion of the center keel 220*b*. The at least partially cylindrical relief portions of the center keel 220*b* may be shaped like a cylinder with a portion of opposing rounded sides cut off such that the rubber bumper may flex side to side without hitting the center keel. The at least partially cylindrical relief portions of the center keel 20*a* allow the center skag 205*b* and the ski runner 207 to remain flat against the surface of the snow when the live keel ski 130 makes turns.

The rubber bumpers 210*a* suspend the ski runner 207 and the center skag 205*b* from the underside of the live keel ski 130. The rubber bumpers 210*a* flex side to side and up and down, serving as a shock absorber when the live keel ski 130 hits debris in the snow, or is traveling over ice and other rough terrain. The flexibility of the rubber bumpers 210*a* allows the ski body 200 of the live keel ski 130 to lean on turns while the center skag 205*b* remains level to the snow as it grips the terrain. The rubber bumpers 210*a* and the rubber dampener 210 individually and collectively produce a safer, smoother ride for users of the snow bike 100 and take a degree of edginess out of the live keel ski 130.

Figure 3:
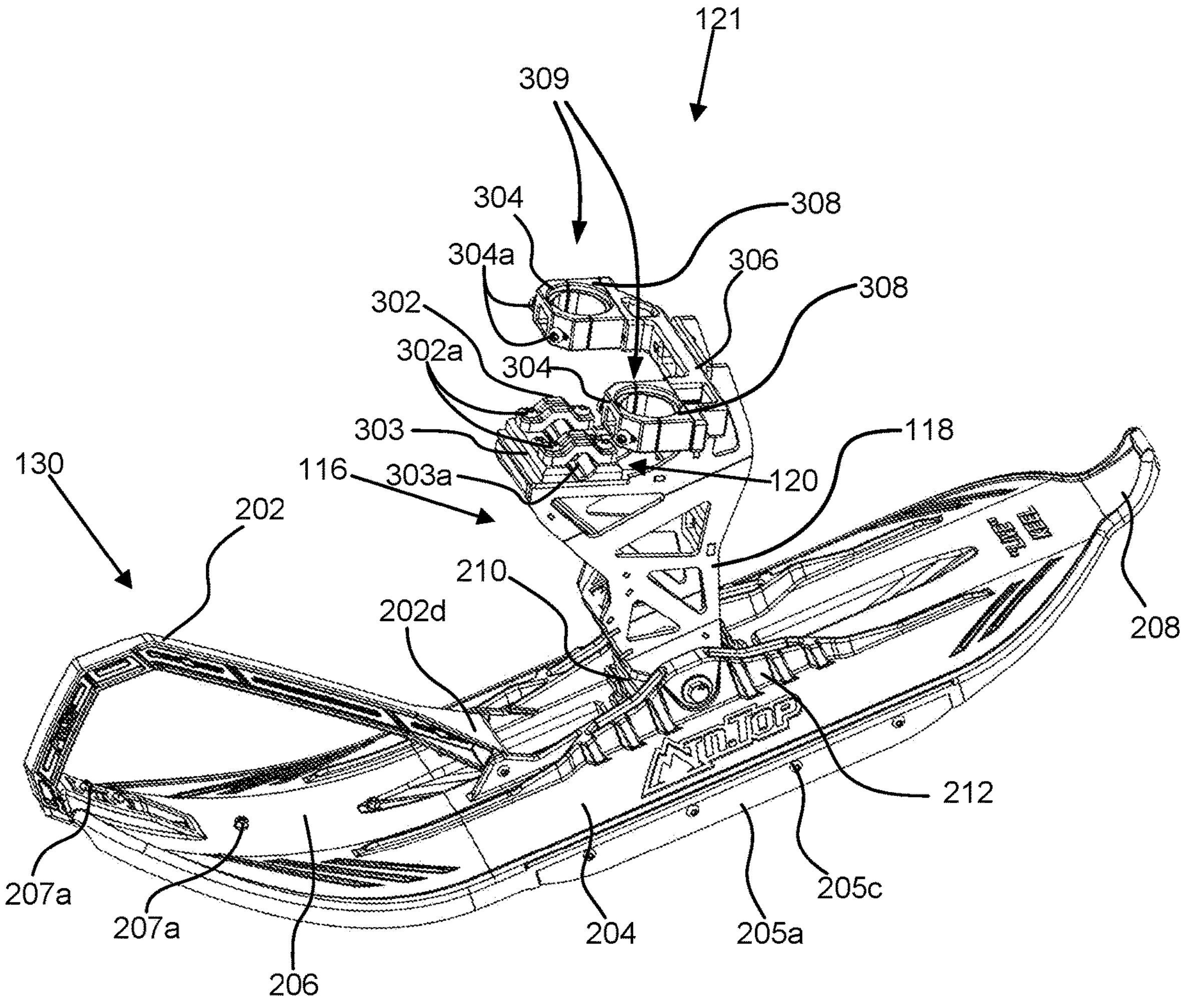
FIG. 3 is a perspective view of the front ski assembly of FIG. 2A attached to the live keel ski.

FIG. 3 is a perspective view of the front ski assembly 116 coupled to the live keel ski 130. Referring to FIG. 3, axle clamp bolts 302*a* hold a top portion 302 and a bottom v-plate portion 303 of the universal axle clamp assembly 120 together. An axle channel 303*a* is located between the top portion 302 and the bottom v-plate portion 303 of the universal axle clamp assembly 120. In various embodiments, the axle channel 303*a* is configured to accommodate a range of predetermined diameters of front motorcycle axles 111.

Referring to FIG. 3, the universal fork clamp assembly 121 is depicted. The universal fork clamp assembly 121 has two fork clamps 309 connected by a fork clamp support bar 306. In various embodiments, the universal fork clamp assembly 121 includes two fork clamps 309 and a fork clamp support bar 306, where the two fork clamps 309 are configured to couple to the fork clamp support bar 306, and each fork clamp 309 is independently positionable side to side along a portion of a length of the support bar 306 via parallel slots in the fork clamp support bar 306, the parallel slots being configured to accommodate a range of predetermined fork tube spacings. The fork clamps 309 are cylinder-like in shape and each fork clamp 309 has a front fork clamp half 304 and a back fork clamp half 308. The motorcycle fork tube 113 fits in the space formed between the front fork clamp half 304 and the back fork clamp half 308. The front fork clamp half 304 and the back fork clamp half 308 are configured to grasp the motorcycle fork tube 113, linking the front ski assembly 116 to the motorcycle fork tubes 113. Bolts 304*a* fasten the fork tube guards 115 to the front fork clamp half 304.

Figure 4B:
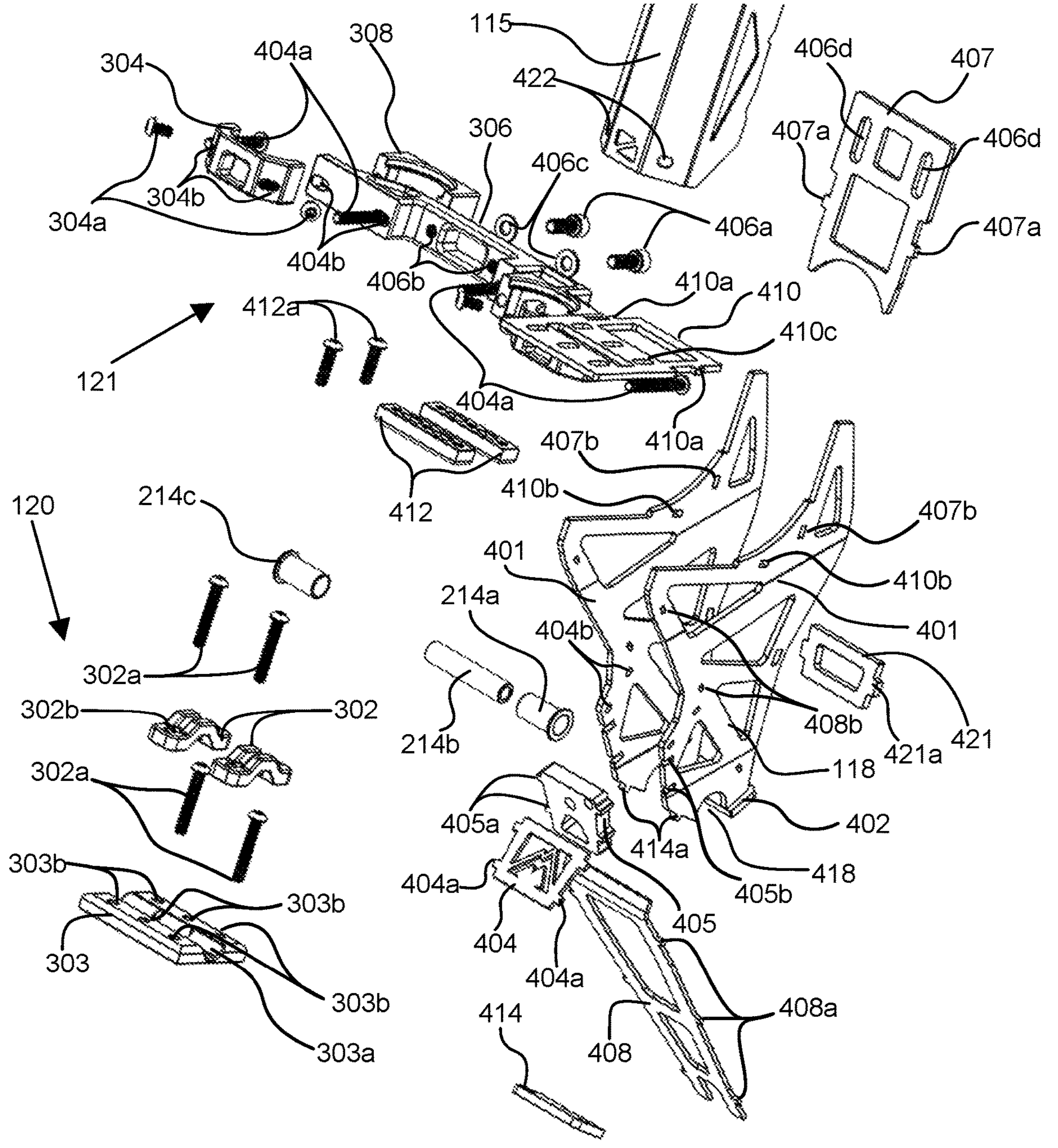
FIG. 4B is an exploded view of the selected components of the front ski assembly of FIG. 2A.

FIG. 4A is a perspective view of certain portions of the front ski assembly 116 depicted in FIGS. 1 and 2A-2E decoupled from a ski. FIG. 4B is an exploded view of selected components of the front ski assembly 116 depicted in FIGS. 1 and 2A-2E. The selected components depicted in FIG. 4B include the universal fork clamp assembly 121, the spindle body 118, and the universal axle clamp assembly 120.

Referring to FIGS. 4A and 4B, the spindle body 118 is depicted. The spindle body 118 includes a series of plates that in certain embodiments are made of metal. In one embodiment, the plates of the spindle body may have holes and slots that are designed to reduce the weight of the spindle body 118 while maintaining structural integrity. These holes and slots may be located at positions throughout the plates of the spindle body 118 in order to achieve a balance between strength and weight.

In certain embodiments, the plates may include slotted holes that allow the positions of the universal axle clamp assembly 120 and the universal fork clamp assembly 121 to be adjusted so that the spindle body 118 can fit motorcycles with different fork tube 113 spacings and different fork tube 113 diameters.

The spindle body 118 has two side sections 401 that form a side of the spindle body 118 and a bottom beam 402 that connects the two side sections 401 near a back portion of the bottom portion of the spindle body 118. The two side sections 401 and the bottom beam 402 give structure and support to the front ski assembly 116.

A lower plate 405, a second lower plate 414, a middle plate 404, an upper plate 408, a lower back plate 421, an upper back plate 407, and an axle clamp plate 410 are depicted between the two side sections 401 of the spindle body. The plates 405, 414, 404, 408, 421, 407, and 410 span a gap between the two side sections 401 of the spindle body 118 and give strength and support to the front ski assembly 116.

The lower plate 405 has protrusions that protrude from side edges of the lower plate and fit in notches or holes in other plates of the spindle body 118. In one embodiment, protrusions 405*a* protrude from the side edges of the lower plate 405. The protrusions 405*a* are configured to fit to notches 405*b* in the side sections 401 of spindle body 118. A top edge of the lower plate 405 interfaces with the middle plate 404. A lower edge of the lower plate 405 interfaces with the second lower plate 414.

The second lower plate 414 has notches or holes on a face of the second lower plate that are configured to receive the protrusions of other plates of the spindle body 118. The second lower plate sits near the ski axle 214 near the bottom portion of the spindle body 118. A top edge of the second lower plate 414 interfaces with the lower plate 405. A bottom edge of the second lower plate 414 interfaces with the rubber dampener 210. In one embodiment, holes on the second lower plate 414 receive protrusions 414*a* of the side sections 401 of the spindle body 118.

The middle plate 404 has a logo depicted on its face. The middle plate 404 sits near a front portion of the spindle body 118. A bottom edge of middle plate 404 interfaces with the lower plate 405. A top edge of middle plate 404 interfaces with the upper plate 408. The middle plate 404 has protrusions on side edges of the middle plate 404 that are configured to fit in notches or holes in other plates of the spindle body 118. In one embodiment, bolts 404*a* or rods are located on the side edges of the middle plate 404. The bolts 404*a* or rods fit into slots 404*b* on the side sections 401 of the spindle body 118.

The upper plate 408 extends from an upper front portion of the spindle body 118, near the universal axle clamp assembly 120, to a lower back portion of the spindle body 118, where the upper plate 408 interfaces with the bottom beam 402 of the spindle body 118. The upper plate 408 has protrusions on the side edges of the upper plate 408 that are configured to fit in notches or holes in other plates of the spindle body 118. In one embodiment, protrusions 408*a* on the side edges of the upper plate 408 fit into holes 408*b* in the side sections 401 of the spindle body 118. In another embodiment, the upper plate 408 has two large holes in its center that decrease the weight of the upper plate 408.

The lower back plate 421 sits near a back portion of the spindle body 118 near the middle of the spindle body 118. The lower back plate 421 has protrusions on the side edges of the lower back plate 421 that are configured to fit in notches or holes in other plates of the spindle body 118. In on embodiment, the lower back plate 421 has protrusions 421*a* on the lower back plate 421 side edges that fit into holes 421*b* in the side sections 401 of the spindle body 118. In another embodiment, the lower back plate 421 has a hole in the center that decreases the weight of the lower back plate 421.

The upper back plate 407 is configured to fit near a top portion of the spindle body 118. The upper back plate 407 has protrusions on the side edges of the upper back plate 407 that are configured to fit in notches or holes in other plates of the spindle body 118. In The universal fork clamp assembly 121 is attached to the upper back plate 407 via parallel slots 406*d* in the upper back plate 407. In one embodiment, the upper back plate 407 has protrusions 407*a* on upper back plate 407 side edges that fit into holes 407*b* in the side sections 401 of the spindle body 118. In another embodiment, the upper back plate 407 has two holes that decrease the weight of upper back plate 407.

The axle clamp plate 410 is configured to sit on a platform portion of the spindle body 118. The universal axle clamp assembly 120 is attached to the axle clamp plate 410. Protrusions on side edges of the universal axle clamp plate 410 are configured to fit in holes or notches in other plates of the spindle body 118. In one embodiment, protrusions 410*a* on the side edges of the universal axle clamp plate 410 are configured to fit into holes 410*b* in the side sections 401 of the spindle body 118. In another embodiment, a back portion of the axle clamp plate 410 sits between the side sections 401 of the spindle body 118, and a front portion of the axle clamp plate 410 sits on top of the platform portion of the spindle body 118.

The plates that comprise the spindle body 118 allow for convenient maintenance of the front ski assembly 116. Spindle bodies of other snow bikes are often one solid piece and if a portion of the spindle body is damaged the whole spindle body may need to be replaced. The spindle body 118 claimed in this application has various plates, that together, make up the entire spindle body 118. If one of the various plates is damaged, the plate may be exchanged without having to replace the entire spindle body 118.

The bolts 304*a* are used to secure the fork tube guard 115 to the front fork clamp half 304 of the universal fork clamp assembly 121. The bolts 304*a* pass through holes 422 on the fork tube guard 115 and are secured into holes 304*b* on the front fork clamp half 304, maintaining the fork tube guard 115 in place.

The front fork clamp half 304 and the back fork clamp half 308 of the universal fork clamp assembly 121 are secured together from the backside of the universal fork clamp assembly using bolts 404*a*. The bolts 404*a* have a head portion and a shaft portion. Previous snow bike conversion kits have typically secured fork clamps using bolts inserted from the side of the fork clamp, rather than the back as disclosed here, which has prevented the development of a universal fork clamp and caused other problems, some of these problems are mentioned in this specification. In the universal fork clamp assembly 121, the bolt 404*a* shaft portion passes through slots 404*b* in the fork clamp support bar 306, through the back fork clamp half 308, and into the front fork clamp half 304 where the bolt 404*a* shaft portion is secured into a threaded hole in the front fork clamp half 304. The slots 404*b* in fork clamp support bar 306 allow for the fork clamp position to be adjusted side to side and then fastened. This gives the universal fork clamp assembly 121 the ability to fit motorcycle fork tubes 113 of different spacings.

The universal fork clamp assembly 121 can also be selectively positioned up and down relative to the spindle body 118. The upper back plate 407 is secured to the side sections 401 of the spindle body 118 at an upper rear portion of the spindle body 118. The protrusions 407*a* are configured to fit holes 407*b* in each of the two side sections 401 of the spindle body. The universal fork clamp assembly 121 is secured to the upper back plate 407 and may be mechanically positioned up and down. Parallel slots 406*d* in the upper back plate 407 allow the universal fork clamp assembly 121 to be slid up and down relative to the spindle body 118. The universal fork clamp assembly 121 is secured to the upper back plate 407 using bolts 406*a*. The bolts 406*a* pass through the parallel slots 406*d* of the upper back plate 407, then through washers 406*c*, then through holes 406*b* located in the fork clamp support bar 306 to secure the universal fork clamp assembly 121 to the upper back plate 407 which is secured to the two side sections 401 of the spindle body 118.

The universal axle clamp assembly 120 is secured to the spindle body 118 by the axle clamp bolts 302*a* and by bolts 412*a*. The axle clamp bolts 302*a* pass through holes 302*b* on the top portion 302 of the universal axle clamp assembly 120, then through holes 303*b* on the bottom v-plate portion 303 of the universal axle clamp assembly 120, then through parallel slots 410*c* in the axle clamp plate 410, then through holes in an axle clamp thread plate 412. The axle clamp bolts 302*a* are tightened into the axle clamp thread plate 412. The parallel slots 410*c* in the axle clamp plate 410 allow for the universal axle clamp assembly 120 to be selectively positionable forwards and backwards relative to the spindle body 118 to accommodate different front motorcycle axle 111 configurations. The axle clamp plate 410 is secured to the two side sections 401 of the spindle body 118 by protrusions 410*a* that fit the holes 410*b* in the side sections 401 of the spindle body 118.

Ski axle bushings 214*a*, 214*b*, and 214*c* can be seen in FIG. 4B. The ski axle 214 seen in FIG. 4A passes through the ski axle bushings 214*a*, 214*b*, and 214*c*. The ski axle bushing 214*b* passes through a space 418 of the spindle body

118. The ski axle bushing 214*a* and the ski axle bushing 214*c* do not pass through the space 418 of the spindle body 118. The ski axle bushing 214*a* and 214*c* are configured to interface with opposite ends of the ski axle bushing 214*b*. The ski axle bushings 214*a* and 214*c* partially pass through the ski ridges 212 of the live keel ski 130. A lipped end ski axle bushing 214*a* is too large to pass through the hole in the ski ridge 212 and prevents the ski axle bushing 214*a* from entirely passing through the hole in the ski ridge 212. A lipped end ski axle bushing 214*c* is too large to pass through the hole in the ski ridge 212 and prevents the ski axle bushing 214*c* from entirely passing through the hole in the ski ridge 212. The lipped end of the ski axle bushings 214*a* and 214*c* may interface with an edge of the ski ridge 212 around the hole in the ski ridge 212.

Figure 5A:
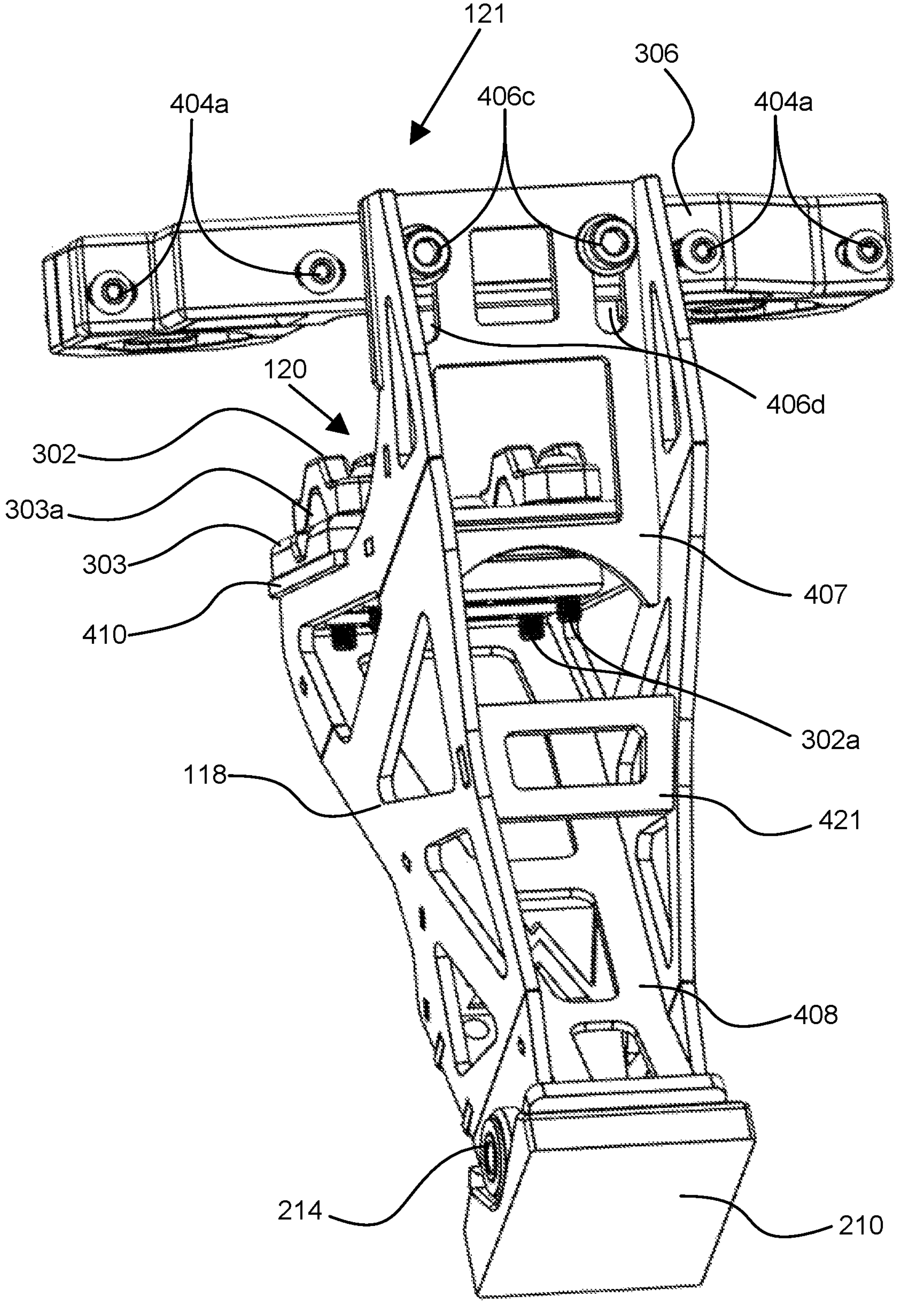
FIG. 5A is a back perspective view of the selected components of the front ski assembly of FIG. 2A.

FIG. 5A is a backside perspective view of selected components the front ski assembly 116. The front ski assembly 116, depicted in FIG. 5A, is fully assembled but is not coupled to the live keel ski 130 or the motorcycle fork tubes 113. The bolts 404*a* attach from the backside of the universal fork clamp assembly 121 and hold the universal fork clamp assembly 121 together. The bolts 404*a* hold both the front fork clamp half 304 and the back fork clamp half 308 together. The bolts 404*a* also hold the fork clamp halves 304 and 308 to the fork clamp support bar 306. The fact that the universal fork clamp assembly 121 is tightened from the backside of the assembly 121 by the bolts 404*a* is key to many of the improvements described in this application. Previous snow bikes have attached and tightened fork clamps from the side, which requires fork clamp bolts to be intensely tightened and limits positionability. Bolts 406*a* attach the universal fork clamp assembly 121 to upper back plate 407 which is attached to the spindle body 118. Notice the parallel slots 406*d* in the upper back plate 407. The parallel slots 406*d* allow for the entire universal fork clamp assembly 121 to be slid up and down relative to the spindle body 118.

Figure 5B:
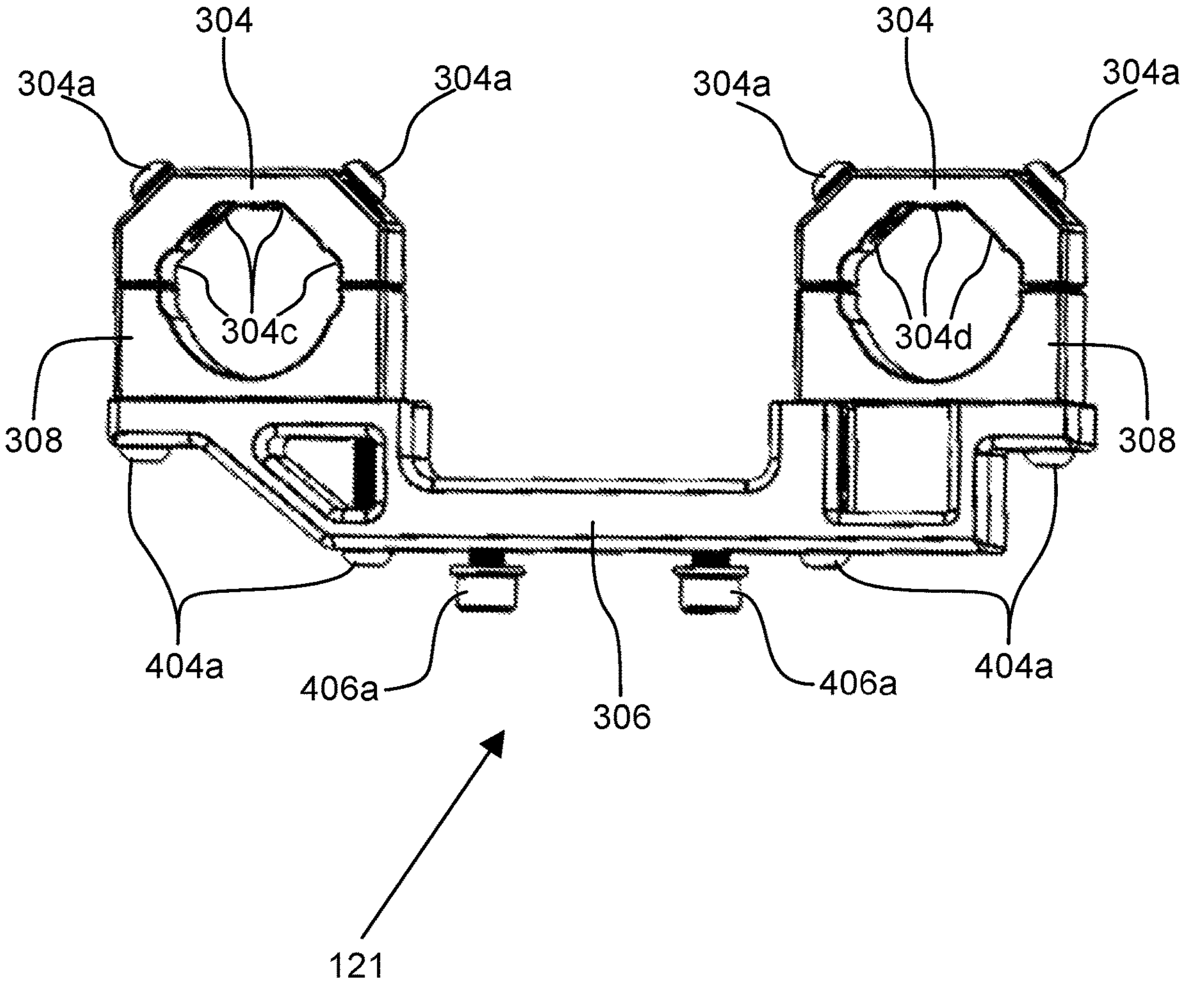
FIG. 5B is a top perspective view of a fork clamp assembly.

FIG. 5B is a top perspective view of the universal fork clamp assembly 121. The front fork clamp half 304, depicted in FIG. 5B, has an approximately semi-circular interior portion. The back fork clamp half 308, depicted in FIG. 5B, has an approximately semi-circular interior portion. The front fork clamp half 304 and the back fork clamp half 308 interface such that the semi-circular interior portion of the front fork clamp half 304 and the semi-circular interior portion of the back fork clamp half 308 form a circular hole that is configured to fit the motorcycle fork tube 113. The interior portion of the front fork clamp half 304 has relieved portions 304*c* and unrelieved portions 304*d*. The interior portion of the back fork clamp half 308 is made of a flexible plastic, rubber, composite, or similar material.

The interior portion of the back fork clamp half 308 is made of a flexible plastic that molds to fit the motorcycle fork tube 113 such that when the universal fork clamp assembly 121 is tightened the flexible plastic portion interfaces with the motorcycle fork tube 113. In operation, the plastic portion of the interior of the back fork clamp half 308 is load bearing and thus, takes the brunt of the force on the fork tubes 113. Since the plastic portion bears the load, the clamp does not need to be intensely tightened. Because the fork clamp is not extremely tight, the unrelieved portions 304*d* on the front fork clamp half 304 do not dent or damage the fork tube 113 of the motorcycle.

A front portion of the front fork clamp half 304 is configured to be fastened to the fork tube guards 115. Bolts 304*a* fasten the fork tube guard 115 to the front portion of the front fork tube half 304. A back portion of the back fork clamp half 308 is configured to interface with the fork clamp support bar 306. A flat back portion of the back fork clamp half 308 rests flush against a flat front portion of the fork clamp support bar 306 when the universal fork clamp assembly 121 is fully assembled.

In one embodiment, the front fork clamp half 304 may have 4 relieved portions and 3 unrelieved portions that allow the front fork clamp half 304 to interface with motorcycle fork tubes 113 of different diameters.

In one embodiment, the fork clamps of the universal fork clamp assembly 121 may be configured such that the circular hole between the front fork clamp half 304 and the back fork clamp half 308 has a diameter of 48 mm. The relieved portions 304*c* and the unrelieved portions 304*d* may configured to allow the unrelieved portions 304*d* of the front fork clamp half 304 to interface with motorcycle fork tubes 113 with diameters ranging between 47 mm and 49 mm. The relieved portions 304*c* provide space that allows larger motorcycle fork tubes 113 larger than, for example, a 48 mm diameter of the circular hole between front fork clamp half 304 and back fork clamp half 308 to fit the fork clamp and be held by the fork clamp.

By way of example, the fork the universal fork clamp assembly 121 may be configured to fit a range of tube diameters because of the proprietary shape of the interior of the fork clamp. In the embodiment mentioned in the previous paragraph, the diameter of the circular hole between the front fork clamp half 304 and the back fork clamp half 308 was 48 mm and the fork clamp was configured to fit motorcycle fork tubes ranging from 47 to 49 mm. However, in another embodiment the diameter of the circular hole between the front fork clamp half 304 and the back fork clamp half 308 could be smaller or larger and the universal fork clamp could be configured to fit motorcycle fork tubes 113 with diameters that are larger or smaller than the diameter of the center hole between front fork clamp half 304 and back fork clamp half 308.

The fork clamps of the universal fork clamp assembly 121 are an improvement over v-block clamps, which can also fit tubes different diameters because the fork clamps of the universal fork clamp assembly may distribute pressure move evenly around the surface of the motorcycle fork tube 113. V-block clamps create extreme pressure points which may damage the motorcycle fork tube 113. The front fork clamp half 304 does not need to be extremely tight so fork tubes 113 will not be damaged. The universal fork clamp assembly 121 is tightened around the fork clamp using the bolts 404*a* that enter from the backside of the universal fork clamp assembly 121, pass through the fork clamp support bar 306, pass through the back fork clamp half 308, and are secured into the front fork clamp half 304.

In existing accessories for motorized sport vehicles, various clamps may typically be intensely tightened (e.g., to the extent achievable using ordinary tools). Although such an approach may require more effort during installation and maintenance, it is typically accepted for safety reasons. However, the inventors of the present disclosure have uniquely developed certain portions of the fork clamp to use an improved approach. Fork clamps on existing snow bikes are typically tightened by bolts that enter from the side of the fork clamp. Because the bolts are on the side of the fork clamp, they are exposed to potential collisions, torques, or other forces that may loosen the bolts. As a result, in a design with side clamps, bolts may be intensely tightened to the extent that dents and other damage may be done to the fork tubes of the motorcycle.

In the claimed front ski assembly 116 the bolts 404*a* enter the universal fork clamp assembly 121 from the backside. The bolts 404*a* are protected from potential collisions that could occur while riding which could loosen the bolts 404*a* and compromise the fork clamp grip on the fork tube. As a result, the bolts 404*a* do not need to be intensely tightened, so no damage is done to the motorcycle fork tubes 113.

The fork clamp support bar 306, links each side of the universal fork clamp assembly 121 together and allows the distance between the two fork clamps to be selected, via slots 404*b*, to fit motorcycle fork tubes 113 that are spaced at different distances apart. Thus, the various clamp features disclosed herein advantageously provide both safety and improved mechanical integrity as well as easier installation and maintenance.

Figure 6A:
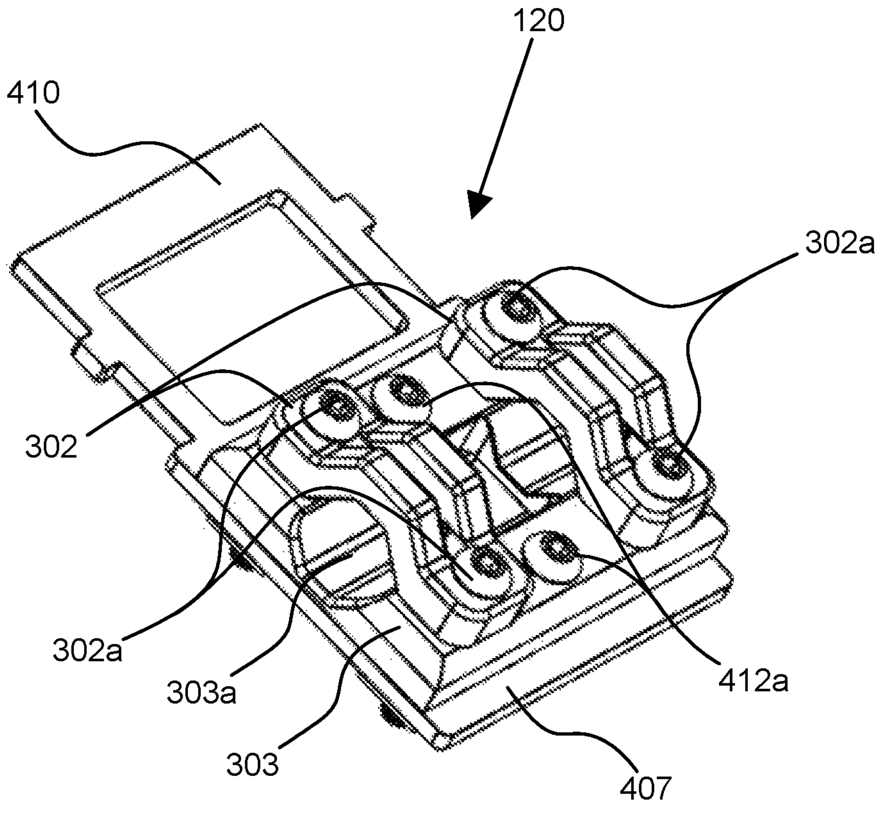
FIG. 6A is a perspective view of a universal axle clamp.

FIG. 6A is a top perspective view of the top of universal axle clamp assembly 120 attached to the axle clamp plate 410, shown from the top. The axle clamp assembly 120 is mechanically moveable on the axle clamp plate 410 relative to the spindle body 118 via parallel slots 410*c*. The axle clamp plate 410 is labeled on both ends to demonstrate that the axle clamp plate 410 is one solid piece. Motorcycles of different models have varied front motorcycle axle 111 diameters and the front motorcycle axle 111 may be attached at selected distances from the motorcycle fork tubes 113 depending on the motorcycle make and model. The universal axle clamp assembly 120 is selectively positionable to accommodate front motorcycle axles 111 that are positioned at varying distances from the motorcycle fork tubes 113 and the universal axle clamp is selectively tightenable to fit varying motorcycle axles 111.

By way of example, in one embodiment the top portion 302 of the universal axle clamp assembly 120 is bowed such that the interior portion of the top portion 302 may interface with the motorcycle axle 111. The bottom v-plate portion 303 of the universal axle clamp assembly 120 has a trough that has a similar shape to the interior portion of the top portion 302. Together the interior portion of the top portion 302 of the universal axle clamp assembly 120 and the interior portion of the bottom v-plate portion 303 of the universal axle clamp assembly 120 form the axle channel 303*a*. The axle channel 303*a* may be hexagonal in shape and may run across a width of the universal axle clamp assembly 120. The axle channel 303*a* may, in one embodiment, be configured to fit a range of motorcycle axles 111. The diameters of most modern motorcycle axles 111 may be within said range.

Previous snow bike conversion kits have attached a front motorcycle axle to a ski assembly using a tube that encompasses the axle. These previous conversion kits required a series of spacers and reducers to accommodate shouldered portions of different front motorcycle axles within the tube. The claimed front ski assembly 116 utilizes a universal axle clamp assembly 120 to directly grasp the factory front motorcycle axle 111. The universal axle clamp assembly 120 claimed herein allows for quicker and easier installation, increased safety, and increased performance of the snow bike 100. The universal axle clamp assembly 120 results in increased safety because it limits possible errors made during the complicated installation of previous axle-holding devices and maintains a tighter grip on the front motorcycle axle 111. The universal axle clamp assembly 120 results in increased performance because a tighter grip is maintained on the front motorcycle axle 111.

Figure 6B:
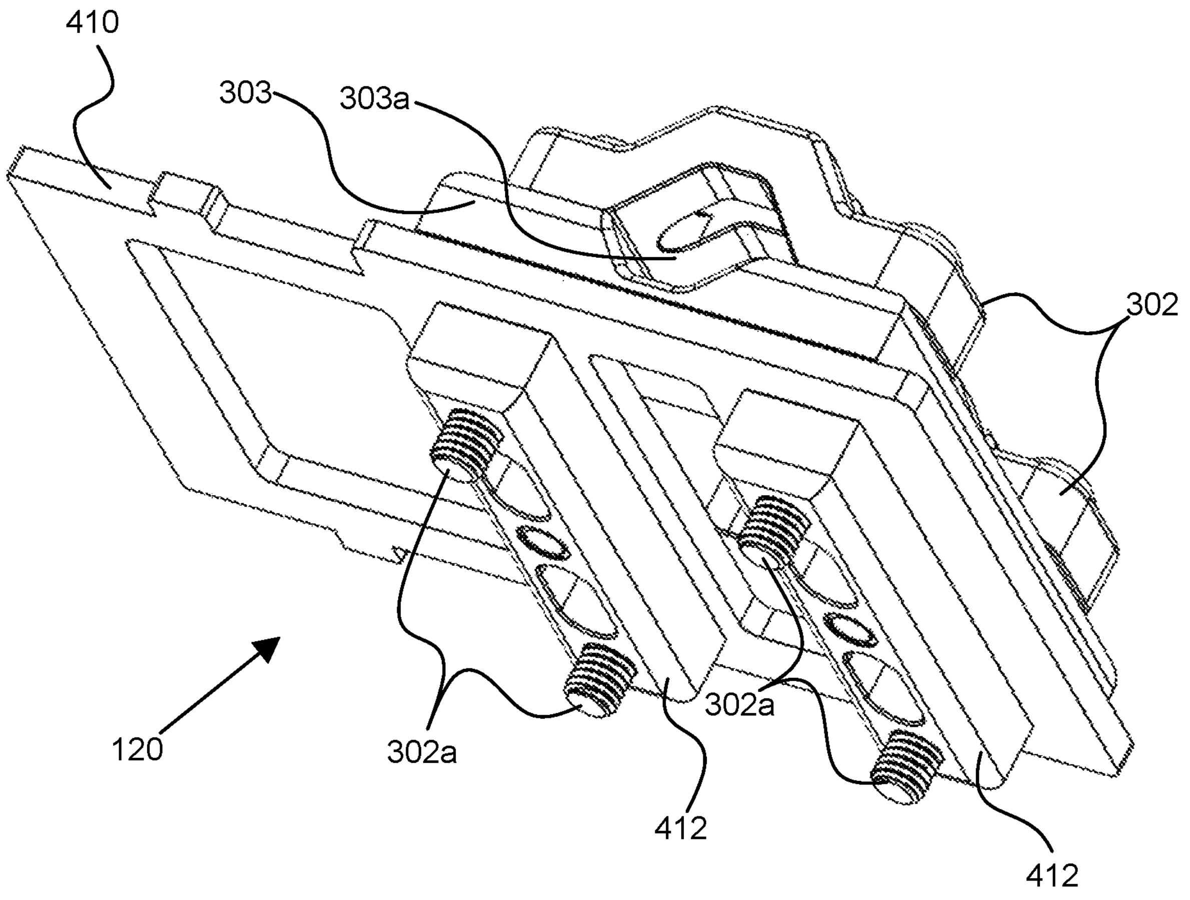
FIG. 6B is another perspective view of the universal axle clamp of FIG. 6A.

FIG. 6B is a perspective view of a bottom portion of the universal axle clamp assembly 120 attached to the axle clamp plate 410. The axle clamp bolts 302*a* have a head portion and a shaft portion. The shaft portions of the axle clamp bolts 302*a* pass through the top portion 302 of the universal axle clamp assembly 120, the bottom v-plate portion 303 of the universal axle clamp assembly 120, and the axle clamp plate 410. The shaft portions of the axle clamp bolts 302*a* are secured to the axle clamp thread plates 412 to hold the universal axle clamp assembly 120 together. The axle clamp thread plates 412 include threaded holes that are configured to receive the axle clamp bolts 302*a*. When the front motorcycle axle 111 is positioned in the axle channel 303*a*, the axle clamp bolts 302*a* can be used to tighten or loosen the universal axle clamp assembly 120 grip on the front motorcycle axle 111.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:

a front ski assembly for converting a front portion of a motorcycle for use as a snow vehicle, the front ski assembly comprising:

a spindle body with an upper portion that is configured to couple to fork tubes of the motorcycle and a lower portion that is configured to couple to a ski; and a fork clamp assembly with fork clamps at both ends of a fork clamp support bar that is coupled to an upper rear portion of the spindle body such that the fork clamp assembly is configured to securely be fastened to the fork tubes from behind the fork tubes rather than from sides of the fork tubes, and where the fork clamp assembly is selectively positionable up and down relative to the spindle body via parallel slots in the spindle body.

2. The apparatus of claim 1, the front ski assembly further comprising:

an axle clamp assembly wherein the axle clamp assembly is configured to:

couple to an upper-forward portion of the spindle body;

be fastened to a front motorcycle axle from a topside of the front motorcycle axle;

be mechanically moveable forwards and backwards relative to the spindle body;

be selectively positionable to accommodate front motorcycle axles that vary by a predetermined distance from the fork tubes; and be selectively tightenable to accommodate a range of predetermined front motorcycle axle diameters.

3. The apparatus of claim 1, wherein the fork clamp assembly comprises two fork clamps and the fork clamp support bar, wherein the two fork clamps are configured to couple to the fork clamp support bar, and each fork clamp is independently positionable side to side along a portion of a length of the support bar via parallel slots in the fork clamp support bar, the parallel slots being configured to accommodate a range of predetermined fork tube spacings.

4. The apparatus of claim 3, wherein two the fork clamps of the fork clamp assembly are configured to accommodate a range of predetermined fork tube diameters.

5. The apparatus of claim 4, the fork clamps comprising:

a fork clamp front half, an interior of the front half comprising relieved portions and unrelieved portions that configure to fit motorcycle fork tubes ranging between 47 mm and 49 mm in diameter; and a fork clamp back half, an interior of the back half comprising a flexible plastic or rubber portion that interfaces with a motorcycle fork tube and is load bearing.

6. The apparatus of claim 5, wherein the unrelieved portions of the front fork clamp halves interface with the motorcycle fork tubes and the relieved portions of the front fork clamp halves do not interface with the motorcycle fork tubes.

7. The apparatus of claim 5, the front ski assembly further comprising:

universal fork tube guards, wherein the universal fork tube guards are configured to:

protect the motorcycle fork tubes from damage by covering a front portion of the fork tube;

fasten to the fork clamp front half of the front ski assembly; and allow snow to exit a space between the fork tube guard and the motorcycle fork tube via a space between the fork tube guard and the motorcycle fork tube, and via holes in the fork tube guard.

8. An apparatus comprising:

a front ski assembly for converting a front portion of a motorcycle for use as a snow vehicle, the front ski assembly comprising:

a spindle body with an upper portion that is configured to couple to fork tubes of the motorcycle and a lower portion that is configured to couple to a ski; and an axle clamp assembly wherein the axle clamp assembly is configured to be fastened to an axle of the motorcycle from above the axle of the motorcycle.

9. The apparatus of claim 8, wherein the axle clamp assembly comprises a universal axle clamp assembly that is configured to be:

mechanically moveable forwards and backwards relative to the spindle body;

selectively positionable to accommodate axles that vary by a predetermined distance from the fork tubes; and selectively tightenable to accommodate a range of predetermined axle diameters.

10. The apparatus of claim 8, wherein the front ski assembly further comprises:

a fork clamp assembly with fork clamps at both ends of a fork clamp support bar that is coupled to an upper rear portion of the spindle body such that the fork clamp assembly is configured to:

securely be fastened to the fork tubes from behind the fork tubes rather than from sides of the fork tubes;

be selectively positionable up and down relative to the spindle body; and accommodate a range of predetermined fork tube diameters.

11. The apparatus of claim 9, wherein the universal axle clamp assembly is configured to couple to a portion of the spindle body and is mechanically moveable forwards and backwards relative to the spindle body via parallel slots in the spindle body.

12. The apparatus of claim 9, wherein the universal axle clamp is a v-block clamp.

13. An apparatus comprising:

a live keel ski for a snow vehicle, the live keel ski comprising:

a ski body, the ski body being semi-parabolic in shape across a width of the ski body, the ski body comprising a flat ski body center portion that runs lengthwise down a center of the ski body, and two parabolic ski body side portions that run lengthwise down respective sides of the ski body;

a ski runner and center skag, suspended from an underside of the ski body by rubber bumpers, wherein the rubber bumpers are attached on a top portion of the rubber bumper to the underside of the flat ski body center portion and on a bottom portion of the rubber bumper to the center skag and ski runner, wherein the wherein the rubber bumpers are located in relieved portions of the center keel of the ski;

three keels, wherein each keel forms a portion of the ski body that protrudes from an underside of the ski body, wherein two outer keels run respectively along each outer edge of the ski and a center keel runs down the center of the ski; and three skags, one skag protruding below an underside of each keel, two outer skags being attached respectively to the two outer keels, and the center skag being suspended below the center keel.

14. The apparatus of claim 13, wherein the ski body is formed as a unitary component.

15. The apparatus of claim 13, wherein the skags are bolted directly to an outer edge of the ski and can be selectively removed from the ski body.

16. The apparatus of claim 15, wherein the skags can be removed and exchanged, and the ski is configured to receive exchangeable skags and ski runners of differing heights that can be selected to enhance handling capabilities of the snow vehicle for operation in different conditions.

17. The apparatus of claim 13, wherein the rubber bumpers are configured to:

flex up and down and side to side such that the center skag and ski runner are moveable up and down and side to side independent of the ski body;

flex to allow the center skag and ski runner to remain flat against the ground when the ski turns or passes over a rough surface; and absorb shock as the ski passes over rough surfaces.

* * * * *